US011755427B2

(12) United States Patent
Lu et al.

(10) Patent No.: US 11,755,427 B2
(45) Date of Patent: Sep. 12, 2023

(54) FAST RECOVERY AND REPLICATION OF KEY-VALUE STORES

(71) Applicant: Alibaba Singapore Holding Private Limited, Singapore (SG)

(72) Inventors: Qingda Lu, Bellevue, WA (US); Rui Wang, Redmond, WA (US); Zhu Pang, Bellevue, WA (US); Shuo Chen, Bellevue, WA (US); Jiesheng Wu, Redmond, WA (US)

(73) Assignee: Alibaba Singapore Holding Private Limited, Singapore (SG)

( * ) Notice: Subject to any disclaimer, the term of this patent is extended or adjusted under 35 U.S.C. 154(b) by 3 days.

(21) Appl. No.: 17/335,728

(22) Filed: Jun. 1, 2021

(65) Prior Publication Data

US 2022/0382651 A1    Dec. 1, 2022

(51) Int. Cl.
*G06F 16/23* (2019.01)
*G06F 11/14* (2006.01)
*G06F 16/27* (2019.01)

(52) U.S. Cl.
CPC ...... *G06F 11/1469* (2013.01); *G06F 11/1471* (2013.01); *G06F 16/2322* (2019.01); *G06F 16/2379* (2019.01); *G06F 16/27* (2019.01); *G06F 2201/80* (2013.01); *G06F 2201/82* (2013.01); *G06F 2201/84* (2013.01)

(58) Field of Classification Search
CPC ............. G06F 11/1469; G06F 11/1471; G06F 16/2322; G06F 16/2379; G06F 16/27; G06F 2201/80; G06F 2201/82; G06F 2201/84

See application file for complete search history.

(56) References Cited

U.S. PATENT DOCUMENTS

| | | | |
|---|---|---|---|
| 7,424,499 B2 | 9/2008 | Lomet | |
| 8,620,884 B2 | 12/2013 | Calder et al. | |
| 8,768,977 B2 | 7/2014 | Golab et al. | |
| 9,176,871 B1 | 11/2015 | Serlet | |
| 9,400,816 B1 | 7/2016 | Gubarev | |
| 9,424,070 B2 | 8/2016 | Hutton et al. | |
| 9,438,426 B2 | 9/2016 | Li et al. | |

(Continued)

OTHER PUBLICATIONS

Office Action for U.S. Appl. No. 17/336,141, dated Oct. 18, 2022, Wang, "Granularly Timestamped Concurrency Control for Key-Value Store", 12 Pages.

(Continued)

*Primary Examiner* — Apu M Mofiz
*Assistant Examiner* — Cindy Nguyen
(74) *Attorney, Agent, or Firm* — Lee & Hayes, P.C.

(57) ABSTRACT

A key-value engine of a storage system may perform a restart recovery after a system failure. The key-value engine may read a metadata log to locate a latest system checkpoint, and load a page mapping table from the latest system checkpoint. The key-value engine may replay to apply changes to the page mapping table from a system transaction log starting from a system transaction replay starting point. The key-value engine may further form one or more read-only replicas using an underlying file stream opened in a read-only mode during the recovery after the system failure to further facilitate fast recovery and provide fast response to user transactions that conduct read only transactions after the system failure.

20 Claims, 9 Drawing Sheets

(56) References Cited

U.S. PATENT DOCUMENTS

| | | | |
|---|---|---|---|
| 9,483,516 B2 | 11/2016 | Lee et al. | |
| 9,684,682 B2 | 6/2017 | Mukherjee et al. | |
| 9,785,510 B1 | 10/2017 | Madhavarapu et al. | |
| 10,127,260 B2 | 11/2018 | Goel et al. | |
| 10,146,793 B2 | 12/2018 | Srivas et al. | |
| 10,289,340 B2 | 5/2019 | O'Krafka et al. | |
| 10,331,797 B2 | 6/2019 | Chang et al. | |
| 10,474,656 B1 | 11/2019 | Bronnikov | |
| 10,482,103 B2 | 11/2019 | Lee et al. | |
| 10,489,406 B2 | 11/2019 | Toillion et al. | |
| 10,496,283 B2 | 12/2019 | Waghulde | |
| 10,552,402 B2 | 2/2020 | Eluri et al. | |
| 10,585,876 B2 | 3/2020 | Brodt et al. | |
| 10,592,411 B2 | 3/2020 | Agarwal | |
| 10,666,703 B2 | 5/2020 | Paduroiu et al. | |
| 10,706,105 B2 | 7/2020 | Boles et al. | |
| 10,706,106 B2 | 7/2020 | Boles et al. | |
| 10,719,562 B2 | 7/2020 | Gupta et al. | |
| 10,725,988 B2 | 7/2020 | Boles et al. | |
| 10,795,871 B2 | 10/2020 | Velayudhan Pillai et al. | |
| 10,956,071 B2 | 3/2021 | Subbarao | |
| 10,984,018 B2 | 4/2021 | Shoolman et al. | |
| 10,996,884 B2 | 5/2021 | Danilov et al. | |
| 11,003,689 B2 | 5/2021 | Lee et al. | |
| 11,023,457 B1 | 6/2021 | Maretic | |
| 11,093,149 B2 | 8/2021 | Gole et al. | |
| 11,100,071 B2 | 8/2021 | Tomlinson et al. | |
| 11,183,241 B2 | 11/2021 | Schreter | |
| 2006/0219772 A1 | 10/2006 | Bernstein et al. | |
| 2009/0119295 A1 | 5/2009 | Chou et al. | |
| 2010/0106695 A1 | 4/2010 | Calder et al. | |
| 2011/0307447 A1 | 12/2011 | Sabaa | |
| 2012/0159098 A1 | 6/2012 | Cheung et al. | |
| 2014/0095810 A1 | 4/2014 | Loewenstein et al. | |
| 2016/0179865 A1 | 6/2016 | Bortnikov et al. | |
| 2017/0011062 A1* | 1/2017 | Zaveri | G06F 16/2379 |
| 2017/0109394 A1 | 4/2017 | Chang | |
| 2017/0177284 A1 | 6/2017 | Maesono | |
| 2017/0220617 A1 | 8/2017 | Bortnikov et al. | |
| 2017/0242785 A1 | 8/2017 | O'Krafka et al. | |
| 2017/0277726 A1 | 9/2017 | Huang et al. | |
| 2018/0300350 A1 | 10/2018 | Mainali et al. | |
| 2019/0236059 A1 | 8/2019 | Reddy et al. | |
| 2019/0266100 A1 | 8/2019 | Mello et al. | |
| 2019/0272254 A1 | 9/2019 | Srivas et al. | |
| 2019/0278783 A1 | 9/2019 | Lipcon | |
| 2019/0340277 A1* | 11/2019 | Thomsen | G06F 11/1469 |
| 2019/0370170 A1 | 12/2019 | Oltean et al. | |
| 2020/0042533 A1 | 2/2020 | Lee et al. | |
| 2020/0257669 A1 | 8/2020 | Boles et al. | |
| 2020/0301900 A1 | 9/2020 | Draperi | |
| 2021/0042286 A1 | 2/2021 | Kimura | |
| 2021/0097036 A1 | 4/2021 | Wetterau et al. | |
| 2021/0103397 A1 | 4/2021 | George | |
| 2022/0318227 A1 | 10/2022 | Le | |
| 2022/0335027 A1 | 10/2022 | Subramanian Seshadri | |
| 2022/0382674 A1 | 12/2022 | Wang | |
| 2022/0382734 A1 | 12/2022 | Peng | |
| 2022/0382760 A1 | 12/2022 | Pang | |
| 2023/0046216 A1 | 2/2023 | Daga et al. | |

OTHER PUBLICATIONS

Office Action for U.S. Appl. No. 17/336,047, dated Dec. 15, 2022, Zhu Pang, "High-Performance Key-Value Store", 24 pages.

Kazmi, "Sort Duplicate Files According to Size and Delete Them", Mar. 2019, 5 pgs.

Office Action for U.S. Appl. No. 17/336,047, dated Jun. 2, 2023, Pang, "High-Performance Key-Value Store", 11 pages.

Pang, et al., "ArkDB: A Key-Value Engine for Scalable Cloud Storage Services", Jun. 2021, 14 pgs.

Office Action for U.S. Appl. No. 17/335,853, dated Jun. 5, 2023, "Garbage Collection of Tree Structure with Page Mappings ", 18 pages.

* cited by examiner

FAST RECOVERY AND REPLICATION OF KEY-VALUE STORES

BACKGROUND

Persistent key-value stores have played a fundamental and important role in internet-scale services, such as cloud services, which use key-value stores for persisting or maintaining system states and facilitating fast lookups. A key-value store is a storage paradigm configured to store, retrieve, and manage associative arrays, and store data as a set of unique identifiers, with each unique identifier being associated with a corresponding value. A unique identifier may act as a key for a piece of data, and a corresponding value associated with that unique identifier may be the piece of data itself or a location of that piece of data. A data structure commonly used for the key-value store may be referred to as a dictionary or a hash table, for example. Different from conventional relational databases that requires definition of a data structure in a database as a series of tables including fields with predefined data types in advance, key-value stores can treat data as a single opaque collection, and allow each record to have different fields of different data types, thus offering flexibility and enabling a concept of object-oriented storage that resembles the concept of object-oriented programming.

In a key-value store, a family of index structures, such as a tree structure, may be used to maintain a mapping table to map pages in the tree structure to storage locations of the pages (for example, the most recent versions of the pages). In this way, when a key-value pair is inserted or updated in a log-structured storage system, changes may not need to be propagated to the root of the tree structure. Although such an approach may be applicable to cloud storage due to its log-structured semantics, this approach also introduces a number of complexities, of which the problems of how to provide a fast recovery at system failures and how to provide continuous read-only replicas are especially important.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

The application describes multiple and varied embodiments and implementations. The following section describes an example framework that is suitable for practicing various implementations. Next, the application describes example systems, devices, and processes for implementing a storage engine.

Example Environment

Figure 1:
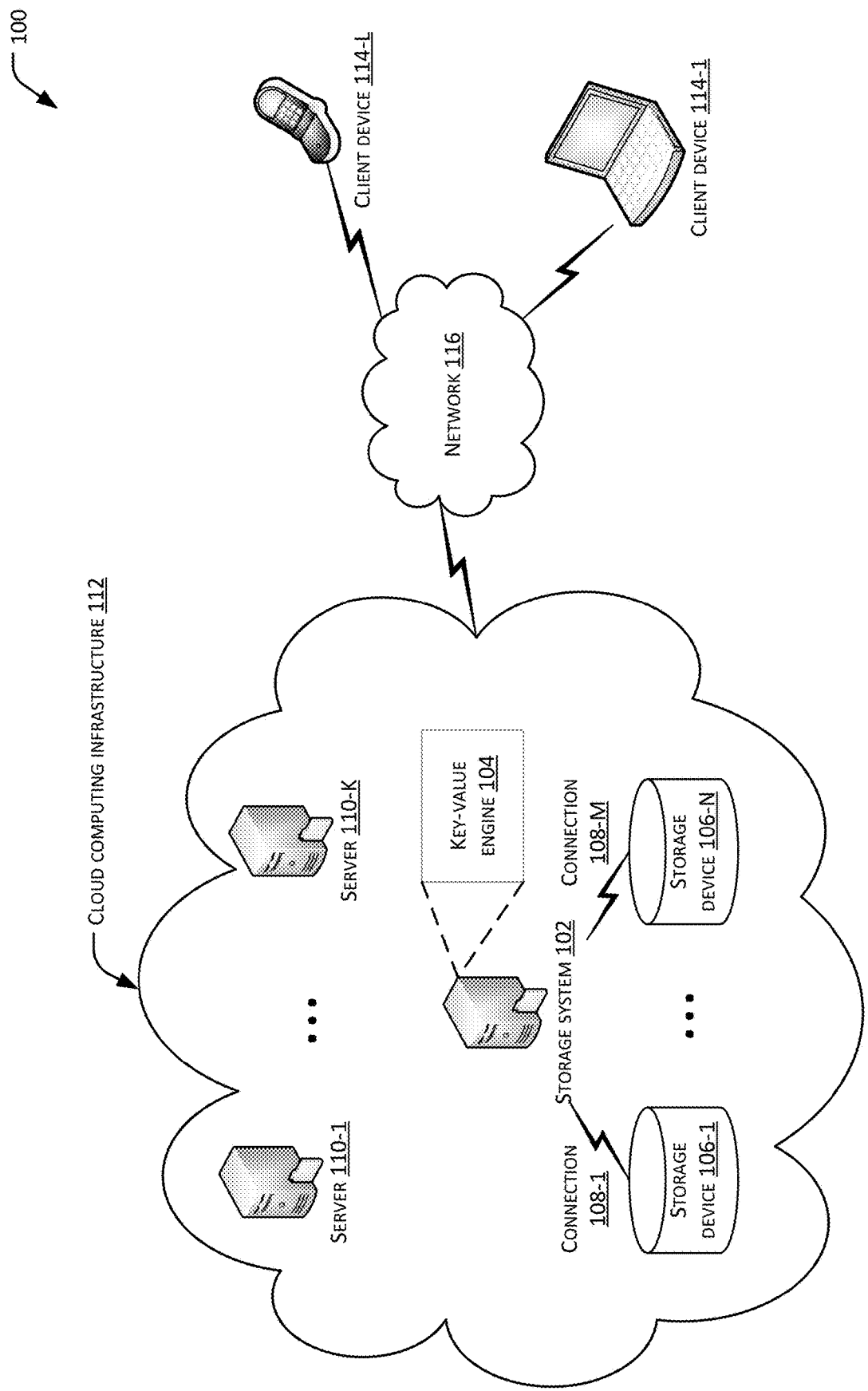
FIG. 1 illustrates an example environment in which a storage system may be used.

FIG. 1 illustrates an example environment 100 usable to implement a storage system. The environment 100 may include a storage engine 102. In implementations, the storage system 102 may include a key-value engine 104, and one or more storage devices 106-1, . . . , 106-N (which are collectively called as storage devices 106), where N is an integer greater than or equal to one. The key-value engine 104 and the plurality of storage devices 106 may communicate data with one another via one or more connections 108-1, . . . , 108-M (which are collectively called as connections 108), where M is an integer greater than or equal to one. In this example, the one or more storage devices 106 are said to be included in the storage system 102. In other instances, the one or more storage devices 106 may be associated with and accessible to the storage system 102.

In this example, the storage system 102 is described to be an individual entity. In other instances, the storage system 102 may be located or included in one or more servers 110-1, . . . , 110-K (which are collectively called as servers 110), where K is an integer greater than or equal to one. In implementations, the storage system 102 may be included in a datacenter or cloud computing infrastructure 112, which may include, for example, a plurality of servers (such as the servers 110). In implementations, the storage system 102 may be a part of the datacenter or cloud computing infrastructure 112, and may be responsible for storing data and providing related storage functions such as recording log records, querying data in response to user requests, etc. Furthermore, in implementations, the environment 100 may further include one or more client devices 114-1, . . . , 114-L (which are collectively called as client devices 114), where L is an integer greater than or equal to one. The one or more client devices 114 may communicate data with the datacenter or cloud computing infrastructure 112 (including the storage system 102 and/or the servers 110) through a network 116.

In implementations, each of the one or more servers 110 and the one or more client devices 114 may be implemented as any of a variety of computing devices, but not limited to, a desktop computer, a notebook or portable computer, a handheld device, a netbook, an Internet appliance, a tablet or slate computer, a mobile device (e.g., a mobile phone, a personal digital assistant, a smart phone, etc.), a server computer, etc., or a combination thereof.

In implementations, each of the one or more storage devices 106 may be implemented as any of a variety of devices having memory or storage capabilities, but not limited to, a block storage device, a solid state device (SSD), a NUMA (Non-Uniform Memory Access) device, a NVMe (Non-Volatile Memory Express) device, etc.

The one or more connections 108 may be a data communication network including one or more data communication lines or channels that connect the storage system 102 (such as a memory of the storage system 102) and the one or more storage devices 106 through wireless and/or wired connections. Examples of wired connections may include an electrical carrier connection (for example, a communication cable, a computer or communication bus such as a serial bus, a PCIe bus or lane, etc.), an optical carrier connection (such as an optical fiber connection, etc.). Wireless connections may include, for example, a WiFi connection, other radio frequency connections (e.g., Bluetooth®, etc.), etc.

In implementations, the network 116 may be a wireless or a wired network, or a combination thereof. The network 116 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof. Wired networks may include an electrical carrier connection (such a communication cable, etc.) and/or an optical carrier or connection (such as an optical fiber connection, etc.). Wireless networks may include, for example, a WiFi network, other radio frequency networks (e.g., Bluetooth®, Zigbee, etc.), etc.

Example Storage System

Figure 2:
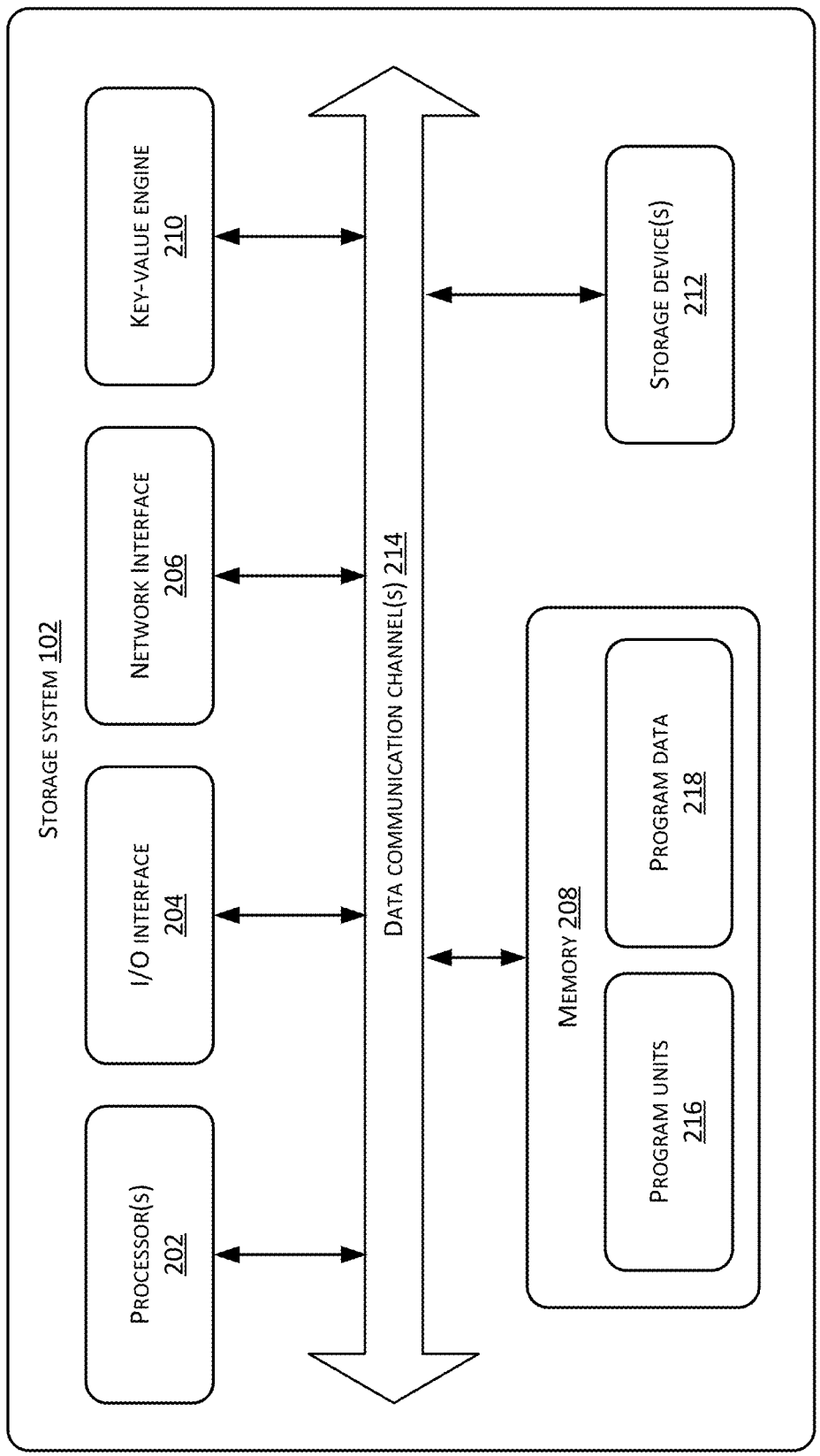
FIG. 2 illustrates the example storage system in more detail.

FIG. 2 illustrates the storage system 102 in more detail. In implementations, the storage system 102 may include, but is not limited to, one or more processors 202, an input/output (I/O) interface 204, and/or a network interface 206, and memory 208. Additionally, the storage system 102 may further include a key-value engine 210 (such as the key-value engine 104), one or more storage devices 212 (such as the one or more storage devices 106), and one or more data communication channels 214. In implementations, the key-value engine 210 may include at least one processor (such as the processor 202) and memory (such as the memory 208).

In implementations, some of the functions of the storage system 102 may be implemented using hardware, for example, an ASIC (i.e., Application-Specific Integrated Circuit), a FPGA (i.e., Field-Programmable Gate Array), and/or other hardware. In implementations, the storage system 102 may include one or more computing devices, or may be included in one or more computing devices.

In implementations, the processors 202 may be configured to execute instructions that are stored in the memory 208, and/or received from the I/O interface 204, and/or the network interface 206. In implementations, the processors 202 may be implemented as one or more hardware processors including, for example, a microprocessor, an application-specific instruction-set processor, a physics processing unit (PPU), a central processing unit (CPU), a graphics processing unit, a digital signal processor, a tensor processing unit, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 208 may include computer readable media (or processor readable media) in a form of volatile memory, such as Random Access Memory (RAM) and/or non-volatile memory, such as read only memory (ROM) or flash RAM. The memory 208 is an example of computer readable media (or processor readable media).

The computer readable media (or processor readable media) may include a volatile or non-volatile type, a removable or non-removable media, which may achieve storage of information using any method or technology. The information may include a computer readable instruction (or a processor readable instruction), a data structure, a program module or other data. Examples of computer readable media (or processor readable media) include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media (or processor readable media) does not include any transitory media, such as modulated data signals and carrier waves.

In implementations, the memory 208 and the one or more storage devices 212 may include, but are not limited to, different types of memory or storage devices having different storage and/or processing performances, such as memory or storage devices having different response latencies, storage devices having different degrees of proximities to the processors and/or the key-value engine 210 of the storage system 102, memory or storage devices having different data access (i.e., data read and/or write) speeds, memory or storage devices having different program erase cycles and/or read disturb thresholds, etc. In implementations, the memory 208 may have a better performance (such as a lower response latency, a higher data access speed, etc.) and/or a closer proximity to the processors and/or the key-value engine 210 of the storage system 102, as compared to the one or more storage devices 212.

By way of example and not limitation, the memory 208 may be implemented as any of a variety of different types of memory devices having and providing storage capabilities, and may include, but are not limited to, a primary storage, etc. In implementations, the primary storage may include, but is not limited to, a cache memory, a main memory (for example, random access memory (RAM), such as dynamic random access memory (DRAM), etc.), DCPMM (i.e., a data center persistent memory module, such as Optane™ persistent memory), NVMe (i.e., non-volatile memory express), etc.

Furthermore, the one or more storage devices 212 (or the one or more storage devices 106) may be implemented as any of a variety of different types of storage devices having and providing storage capabilities, and may include, but are not limited to, a secondary storage, and a tertiary storage, etc. In implementations, the secondary storage may include, but is not limited to, a flash memory or solid state device (SSD), a hybrid hard drive (HHD), a hard disk drive (HDD), etc. The flash memory or solid state device may include, for example, a SLC (i.e., single-level cell) flash memory, a MLC (i.e., multi-level cell) flash memory (such as TLC (i.e., triple-level cell) flash memory, QLC (i.e., quad-level cell) flash memory, PLC (i.e., penta-level cell) flash memory, for example), etc. In implementations, the tertiary storage may include, but is not limited to, external memory or removable storage media, such as an external flash drive or SSD, an external HHD, an external HDD, etc.

In implementations, the one or more data communication channels 214 may include at least one or more data communication lines or channels that enable different components (such the one or more processors 202, memory 208, the key-value engine 210, one or more storage devices 212, etc.) of the storage system 102 to communicate data and instructions with one another through wireless and/or wired connections. Examples of wired connections may include an electrical carrier connection (for example, a communication cable, a computer or communication bus such as a serial bus, a PCIe bus or lane, etc.), an optical carrier connection (such as an optical fiber connection, etc.). Wireless connections may include, for example, a WiFi connection, other radio frequency connections (e.g., Bluetooth®, etc.), etc.

Although in this example, only hardware components are described in the storage system 102, in other instances, the storage system 102 may further include other hardware components and/or other software components such as program units 216 to execute instructions stored in the memory 208 for performing various operations, and program data 218 that stores application data and data of tasks processed by different components of the storage system 102. In this example, the one or more storage devices 212 are described to be included in the storage system 102. In other instances, the one or more storage devices 212 may be associated with the storage system 102. For example, the one or more storage devices 212 may be peripheral and accessible to one or more components of the storage system 102 (such as the key-value engine 210). By way of example and not limitation, the key-value engine 210 may communicate data with the one or more storage devices 212 through one or more data communication channels 214.

Example Storage Architecture

Figure 3:
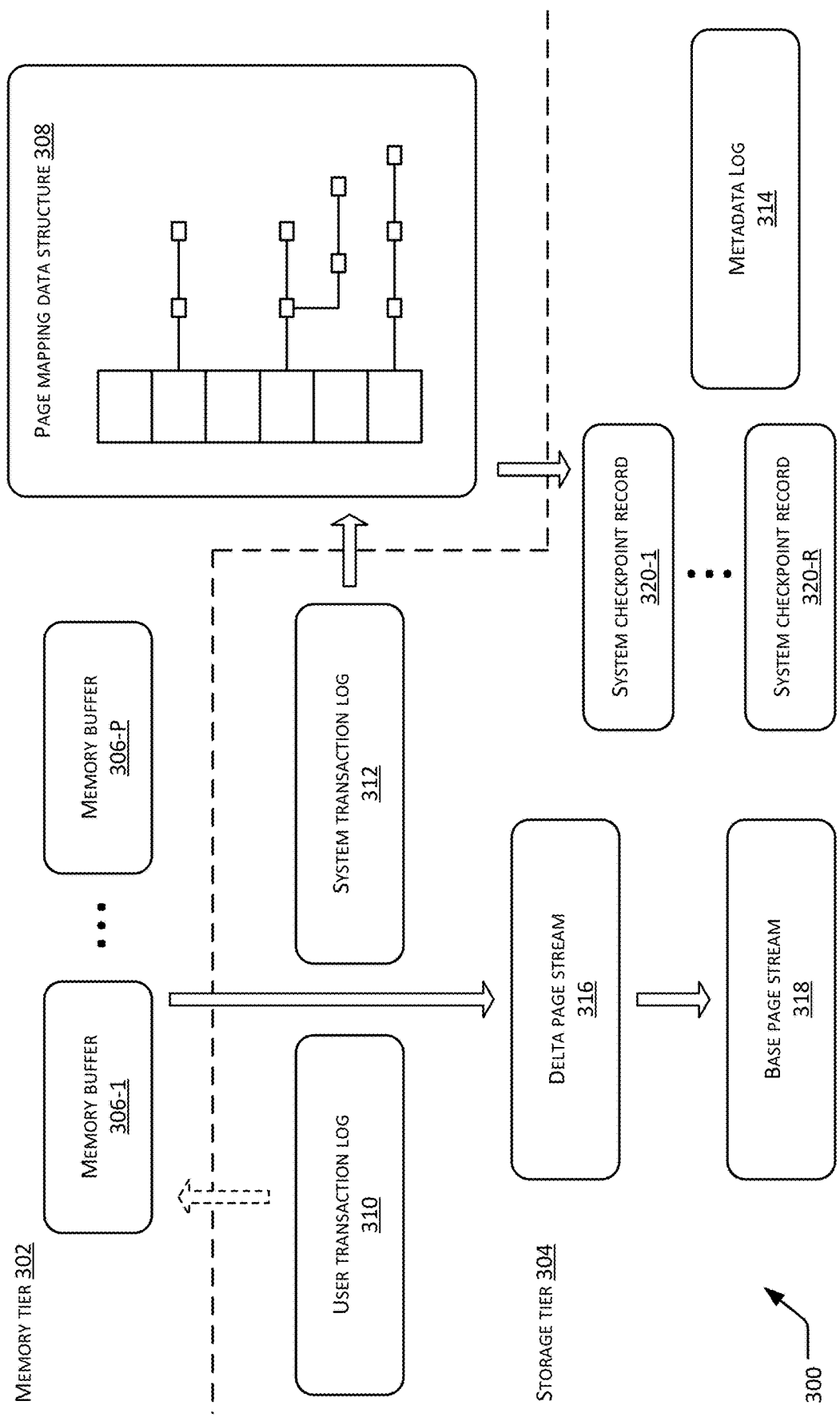
FIG. 3 illustrates an example storage architecture.

FIG. 3 illustrates a schematic diagram depicting example storage architecture usable by the storage system. In this example, the storage system 102 is described to employ an append-only distributed file system for the purpose of illustration. In other examples, the storage system 102 may employ other types of distributed file or object system for processing and storing data (such as objects, records, files, etc.). As shown in FIG. 3, the example storage architecture 300 may include two levels or tiers, namely, an upper memory tier 302 and a lower storage tier 304, which are separated by a dashed line as shown in FIG. 3.

In implementations, the memory tier 302 may include one or more memory buffers 306-1, . . . , 306-P (which may alternatively be referred to as MemoryBuffers 306-1, . . . , 306-P). In implementations, the one or more memory buffers 306-1, . . . , 306-P may also be collectively called as memory buffers 306, where P is an integer greater than or equal to one. In implementations, the memory tier 302 may further include a page mapping data structure 308 (or referred to as PageMappingTable).

In implementations, a memory buffer 306, which may also be referred to as memory table or MemTable, is an in-memory data-structure holding data before the memory buffer 306 (or the data written or stored in the memory buffer 306) is written or flushed to a storage device (such as the storage device 212). The memory buffer 306 may serve both reads and writes (i.e., reading and writing data). New writes inserting data to the memory buffer 306, and reads may be performed by querying the memory buffer 306 before reading from a persistent storage (such as the storage device 212), because data in the memory buffer 306 is newer. Once a memory buffer 306 is full, the memory buffer 306 may become immutable and may be replaced by a new memory buffer 306. A background thread may flush the content of the memory buffer 306 into a file on storage (such as a file on the storage device 212), after which the memory buffer 306 may be removed or destroyed.

In implementations, the page mapping data structure 308 may be considered as an in-memory mapping table that maps pages to memory addresses or storage locations, depending on where respective most recent or latest versions of the pages are located. When an existing page is updated, a new update is captured in a delta (or a change or update) that is prepended to a location of the existing page as indicated in the page mapping data structure 308. When new changes need to be persisted, only the new changes beyond the already-persistent content of the page need to be written to the storage device 212. So a page may include a backward chain of updates with newer deltas in the memory 308 and older deltas on the storage device 212.

In implementations, the page mapping data structure 308 may be implemented as any of a variety of data mapping structures, which include, but are not limited to, a page mapping table, a hash table, etc. In implementations, the one or more memory buffers 306 may include a sealed memory buffer and/or an active memory buffer. In implementations, a memory buffer is sealed when an amount of data written into the memory buffer reaches a predetermined threshold (e.g., 32 MB, 64 MB, 128 MB, etc.), and the memory buffer no longer accepts new data. In implementations, a memory buffer is active when an amount of data written into the memory buffer does not reach the predetermined threshold, and the memory buffer can accept new data. In implementations, the predetermined threshold may be configured by the storage system 102 (or the key-value engine 210). Additionally or alternatively, the predetermined threshold may be determined based on one or more factors, including, but not limited to, a frequency of user transactions or requests, a frequency of data changes made by the user transactions or requests, etc.

In implementations, a transaction may be defined as a unit of work, which may include data updates and have the properties of ACID: atomicity, consistency, isolation and durability. Concurrency control and transaction logging and recovery are required in order to support transactions. In implementations, user and system transactions are different types of transactions. A user transaction may read and/or modify user data. A system transaction may read and modify system data that concerns a running state of a database or user data organization, such as user checkpoints, compaction or garbage collection, and may be performed by the database in the background.

Furthermore, the storage tier 304 may include a plurality of different logs. In implementations, a log may be a file stream (e.g., an append-only stream, etc.) that is used for recording historical data changes made to an associated database, and may include log records, with each record representing one or more data updates or changes. In implementations, the plurality of logs may include, but are not limited to, a user transaction log 310 (or referred to as UserTransactionLog), a system transaction log 312 (or referred to as SysTransactionLog), and a metadata log 314 (or referred to as MetadataLog).

Additionally, the storage tier 304 may further include a plurality of different types of file streams, including, but not limited to, a delta page stream 316 (or referred to as DeltaPageStream), and a base page stream 318 (or referred to as BasePageStream), for example. In implementations, the storage tier 304 may also include one or more system checkpoint records 320-1, . . . , 320-R (which may be alternatively referred to as SystemCheckpoint 320-1, . . . , 320-R). In some cases, the one or more system checkpoint records 320-1, . . . , 320-R may also collectively be called as system checkpoint records 320, where R is an integer greater than or equal to one. In implementations, a transaction log (such as the user transaction log 310, the system transaction log 312, or the metadata log 314) may be a type of log recording changes made by transactions. In implementations, the user transaction log 310 and the system transaction log 312 may be logs for user and system transactions respectively. In implementations, the metadata log may maintain timestamps and locations of system checkpoints.

In implementations, a file stream may include an append-only byte stream hosted by a file system used by the storage system 102. By way of example and not limitation, the file system used by the storage system 102 may include, but is not limited to, a distributed log-structured file system. In implementations, the distributed log-structured file system may be implemented in a distributed environment with redundancy through multiple replicas or erasure coding. In implementations, the base page stream 318 may be a type of file stream including base pages. In implementations, the delta page stream 316 may be a type of file stream including delta pages. A base page is a leaf page directly linked into a tree or hierarchical data structure (such as B+ tree, etc.) i.e., pointed by its parent index page. Any changes to a leaf page are captured in delta pages. The content of a page at a leaf level (i.e., content of a leaf page) of the tree or hierarchical data structure (such as B+ tree, etc.) may be included in a base page thereof and one or more subsequent delta pages. In implementations, a checkpoint may capture a system state of the storage system 102 as of a certain timestamp, so that recovery may be boosted by starting from the checkpoint and replaying only one or more transaction logs (such as the system transaction log 312 and the user transaction log 310) after the checkpoint.

In implementations, a B+ tree may be viewed as a self-balancing tree data structure (such as a B-tree, for example) in which each node may include only keys (not key-value pairs), and an additional level may be added at the bottom of the data structure to store keys and values with linked leaves. In implementations, a B-tree may be a self-balancing tree data structure that maintains sorted data and allows searches, sequential accesses, insertions, and deletions in logarithmic time. In implementations, a non-leaf node (or a parent node) of a B-tree may have k child nodes and may include k−1 keys, with keys stored in a child node being strictly less than or equal to a corresponding key that the parent node uses to find that child node.

In implementations, the memory tier 302 may be located in the memory 208, and the storage tier 304 may be located in the one or more storage devices 212 (or described as being located on storage as a distinction from the memory tier 302 that is located in memory such as the memory 208). As described in the foregoing description, the memory 208 may have a better performance (such as a lower response latency, a higher data access speed, etc.) and/or a closer proximity to the processors and/or the key-value engine 210 of the storage system 102, as compared to the one or more storage devices 212.

Based on the above example architecture, in implementations, when a user transaction causes or makes a data change to a piece of data, the storage system 102 (or specifically the key-value engine 210 of the storage system 102) may first record the data change made by the user transaction into the user transaction log 310. Upon commit (e.g., in response to receiving a commit instruction for the data change), the key-value engine 210 may apply or write the data change to an active memory buffer 306.

Depending on whether an amount of data stored or written in an active memory buffer 306 reaches a predetermined threshold (e.g., 64 MB, etc.), in implementations, the key-value engine 210 may seal the memory buffer 306, so that the memory buffer 306 no longer accepts any new data (such as any new data changes, for example) when the memory buffer 306 reaches the predetermined threshold. In this case, the key-value engine 210 may open or create a new memory buffer 306 to accept new data (e.g., new data changes, etc.).

In implementations, after a memory buffer 306 is sealed, the key-value engine 210 may save or flush the sealed memory buffer 306 into the storage (e.g., a storage device 210 of the one or more storage devices 210) to create or take a user checkpoint. In other words, such saving or flushing operation is referred to as taking a user checkpoint. In this example, if a data structure used for key-value pairs on the storage is a tree or hierarchical structure, such as a B+ tree, etc., data changes to a same leaf page of the tree or hierarchical structure may form a delta page of a host page (or a base or first page) of the leaf page. In implementations, for an update, a host page of the update refers to a page that accommodates the update. In implementations, the key-value engine 210 may write or store delta pages into the delta page stream 316. By way of example and not limitation, the key-value engine 210 may indirectly hook a delta page into the tree or hierarchical structure via page mapping from the host page to the delta page, and add the page mapping into the page mapping data structure 308. By way of page mapping, the key-value engine 210 may obtain actual page content of the leaf page by merging content of the host page and content of the delta page.

In implementations, the key-value engine 210 may set a delta page threshold (e.g., 2, 3, etc.). When the number of delta pages of a leaf page reaches (i.e., is greater than or equal to) the delta page threshold, the key-value engine 210 may compact or combine a host page and the delta pages of the leaf page, for example, into a single contiguous page. In implementations, the key-value engine 210 may add an entry of page mapping for the compacted leaf page to the page mapping data structure 308.

In implementations, the key-value engine 210 may update a storage location or address of the page to a parent page of the leaf page, and rewrite the parent page accordingly. In implementations, the key-value engine 210 may generate or create a page mapping from the original parent page to the rewritten parent page, and add the page mapping into the page mapping data structure 308. Such mapping indicates that an actual or latest content of the parent page of the leaf page is included in the rewritten parent page. In implementations, after the parent page is updated or rewritten, the key-value engine 210 may delete or remove an entry of the page mapping for the compacted leaf page from the page mapping data structure 308.

In implementations, when a host page of a leaf page is compacted, the host page may be rewritten into multiple pages, indicating an occurrence of a page split. In implementations, the compacted leaf page and the rewritten parent page may be referred to as base pages that are added or hooked in the tree or hierarchical structure (such as the B+ tree, for example). The key-value engine 210 may write the base pages into the base page stream 318.

In implementations, the key-value engine 210 may execute page mapping changes (such as adding and deleting entries of page mapping in the page mapping data structure 308, for example) as system transactions, and record these mapping changes in the system transaction log 312. In implementations, after or only after system transaction log records are written or stored in the system transaction log 312, the key-value engine 210 may apply the page mapping changes to the page mapping data structure 308. In implementations, the delta page stream 316, the base page stream 318, and the page mapping data structure 308 form an on-storage tree or hierarchical structure (e.g., an on-storage Bw-tree in this example). The key-value engine 210 may answer or respond a query by merging or combining results from at least one active memory buffer of the one or more memory buffers 306 and the on-storage tree or hierarchical structure. In implementations, a Bw-tree may be a general purpose, concurrent and lock-free self-balancing tree data structure (such as a B+ tree, for example) that has or introduces delta chains (i.e., a chain of deltas) for each node and a mapping data structure layer (e.g., a mapping table layer, etc.) for indirections to improve memory access pattern and locality.

In implementations, the key-value engine 210 may consume extents in the delta page stream 316 and the base page stream 318, along with user checkpoints, page compaction and page split or merge. In implementations, a file stream (such as an append-only file stream) may include a sequence or plurality of extents (such as append-only extents), and each extent may be an erasure or truncation unit in a file stream. In implementations, an extent may be identified by a globally unique identifier (i.e., an extent identifier or abbreviated as ExtentID), and may be an erasure or truncation unit that can be erased or removed individually within a file stream. In implementations, an extent may no longer new data after the extent is sealed.

In implementations, when a page is rewritten (e.g., when an operation or transaction for a user checkpoint, page compaction or page split or merge is performed), old parts of the page that have previously been updated and replaced by new appended data may become invalidated. In implementations, the key-value engine 210 may employ a designated data structure called an extent usage data structure (or abbreviated as ExtentUsageTable) for tracking valid usages of each extent in each file stream (such as the delta page stream 316 and the base page stream 318, etc.). In implementations, the key-value engine 210 may consult the extent usage data structure when performing garbage collection (GC) for a file stream (e.g., the delta page stream 316 or the base page stream 318, etc.). In implementations, the extent usage data structure may take any appropriate form, such as in a form of a table, a list, an array, etc.

In implementations, the key-value engine 210 may preset or predetermine a threshold for a total memory size or a total number of extents tracked in the extent usage data structure in advance. In implementations, the key-value engine 210 may set or determine this threshold based on a number of factors, which may include, but are not limited to, the processing capability and availability of the key-value engine 210, memory configurations of the memory 208 and the storage device 212, a desired frequency of garbage collection set by a user (such as an administrator, for example) of the key-value engine 210, etc. In implementations, when the total memory size or the total number of extents tracked in the extent usage data structure reaches the predetermined threshold, the key-value engine 210 may compact historical usage data in the extent usage data structure and store the compacted usage data into the storage device 212 (e.g., the base page stream 318 in the storage device 212) to control or maintain the total memory size or the total number of extents tracked in the extent usage data structure below the predetermined threshold.

In implementations, the key-value engine 210 may write or flush the page mapping data structure 308 (or more specifically content of the page mapping data structure 308) and the extent usage data structure (or more specifically content of the extent usage data structure 308) into a system checkpoint record 320 periodically (for example, in a predetermined time interval such as every 10 seconds, every 1 minutes, etc.). the key-value engine 210 may write or flush the page mapping data structure 308 and the extent usage data structure into a system checkpoint record 320 on demand (for example, in response to receiving an instruction from a user of the storage system 102). Additionally or alternatively, the key-value engine 210 may write or flush the page mapping data structure 308 and the extent usage data structure into a system checkpoint record 320 when a size of the system transaction log 312 is equal to or greater than a predetermined size threshold. In implementations, the predetermined size threshold may be determined based on a number of factors, which may include, but are not limited to, a size of a storage space of the storage device 212 that is dedicated to store the system transaction log 312, etc. In implementations, after a system checkpoint is taken (i.e., a system checkpoint record 320 for information of the system checkpoint is generated and completed, or the information of the system checkpoint is added to a system checkpoint record 320, etc.), the key-value engine 210 may further record metadata information of the system checkpoint into the metadata log 314. In implementations, the metadata information of the system checkpoint may include, but is not limited to, a timestamp when the system checkpoint is taken, and a storage location or address where the information of the system checkpoint is stored. In implementations, during restart recovery, the key-value engine 210 may start the recovery from the most recent or latest system checkpoint indicated by the metadata log 314.

In implementations, a system checkpoint may create a snapshot for a system state of the storage system 102, which may include, but is not limited to, content of the page mapping data structure 308 and a user transaction replay starting point to provide a starting point to the storage system 102 for recovery. In implementations, a user checkpoint may persist or maintain data in one or more memory buffers 306 and may create a record in the user transaction log 310 to assist transaction replay during restart recovery. A user checkpoint operation may be recorded as a system transaction.

In implementations, the example storage architecture 300 may further support a snapshot isolation level. In implementations, in databases and transaction processing (transaction management), using snapshot isolation may ensure that all reads made in a transaction will see a consistent snapshot of a database (in practice the transaction reads the last committed values that have existed at the time when the transaction starts), and the transaction itself will successfully commit only if no updates that the transaction has made will conflict with any concurrent updates that are made since that snapshot. A snapshot is usually defined based on transaction timestamps. In implementations, a transaction timestamp may be a unique and monotonically increasing number is assigned to each transaction for concurrency control. A transaction working against a snapshot has a read timestamp for all its reads and a commit timestamp for all its writes. In implementations, each user or system transaction may have a separate snapshot read timestamp from a commit timestamp thereof. In implementations, the storage architecture 300 may further include two timestamp generators (not shown in the figure): one timestamp generator for user transactions (which is called a user transaction timestamp generator) and another timestamp generator for system transactions (which is called a system transaction timestamp generator). In implementations, the user transaction timestamp generator and the system transaction timestamp generator may be monotonically increasing counters.

In implementations, for a system transaction, the key-value engine 210 may obtain a commit timestamp (or called a system transaction timestamp or SysTxTimestamp) for the system transaction upon transaction start from the system transaction timestamp generator, and define a snapshot read timestamp for the system transaction based on SysTxTimestamp.

In implementations, for a user transaction, the key-value engine 210 may obtain a commit timestamp (or called a user transaction timestamp or UserTxTimestamp) for the user transaction upon transaction commit from the user transaction timestamp generator, and define a snapshot read timestamp for the user transaction as a combination of a system transaction timestamp and the user transaction timestamp (such as {SysTxTimestamp, UserTxTimestamp}) of the user transaction.

In implementations, the key-value engine 210 may maintain two additional timestamps, namely a maximal committed system transaction timestamp (or referred to as MaxCommittedSysTxTimestamp) and a minimal uncommitted user transaction timestamp (or referred to as MinUncommittedUserTxTimestamp). In implementations, the maximal committed system transaction timestamp may be defined as a maximum system transaction timestamp among system transaction timestamps of all committed system transactions (i.e., all system transactions that have been committed), and may reflect the latest readable snapshot of the storage system 102. In implementations, the minimal uncommitted user transaction timestamp (or MinUncommittedUserTxTimestamp) may be defined as a minimum user transaction timestamp among user transaction timestamps that are associated with all uncommitted user transactions. In implementations, the key-value engine 210 may further maintain a CommittingWindow for all transactions that are in committing phase (i.e., after respective user transaction timestamps are obtained). In this case, MinUncommittedUserTxTimestamp may be a minimum of these user transaction timestamps in CommittingWindow.

In implementations, when a system transaction other than a transaction or operation related to garbage collection starts, the key-value engine 210 may set a snapshot read timestamp for that system transaction as MaxCommittedSysTxTimestamp. In implementations, when a user transaction starts, the key-value engine 210 may set a snapshot read timestamp for that user transaction based on combination of MaxCommittedSysTxTimestamp and MinUncommittedUserTxTimestamp, for example, {MaxCommittedSysTxTimestamp, MinUncommittedUserTxTimestamp−1}. In implementations, the key-value engine 210 may further maintain a minimum (which is called a minimal snapshot read system transaction timestamp or MinSnapshotReadSysTimestamp) of snapshot read system transaction timestamps of all transactions (except system transactions associated with garbage collection), and employ this minimal snapshot read system transaction timestamp as a gate or threshold to guide removal of memory buffers and page mapping entries in the page mapping data structure 308 to ensure the availability of memory buffers that are still needed for snapshot reads.

Example System Transaction

In implementations, the key-value engine 210 may process or perform a user checkpoint or batched page compaction through a number of different operations in a system transaction. In implementations, the key-value engine 210 may perform a first operation to obtain a timestamp (e.g., from the user transaction timestamp generator); perform a second operation to append or add changes that are made to the tree or hierarchical data structure (such as a B+ tree, for example) into the delta page stream 316 and the base page stream 318, and to collect or obtain changes that are to be made to the page mapping data structure 308; and perform a third operation to write a log record of the changes into the system transaction log to commit the system transaction in a timestamp order (e.g., in an order of timestamps of corresponding user transactions that produce the changes), and apply the changes to the page mapping data structure 308.

In implementations, to further reduce processing time of some time-consuming or time-intensive operations (such as the second operation), the key-value engine 210 may process or perform such operations in multiple system transactions in parallel. By way of example and not limitation, the key-value engine 210 may process or perform second operations of multiple system transactions in parallel. Furthermore, to avoid the multiple system transactions from making conflicting changes when some of these multiple system transactions work against a same snapshot, the key-value engine 210 may perform third operations in the multiple system transactions sequentially, and reconcile any conflicting changes that arise when the key-value engine 210 performs the second operations of the multiple system transactions in parallel.

Example Page Mapping

In implementations, each entry of the page mapping data structure 308 may represent or indicate a page (which may be a base page or a delta page), and may include a plurality of fields. By way of example and not limitation, the plurality of fields may include, but are not limited to, a physical page identifier (PID), which may act as a key of an associated entry in the page mapping data structure 308, and may be represented by multiple pieces of information. In implementations, the multiple pieces of information may include, for example, an extent identifier (ExtentID), an offset, a page size, etc.

Figure 4A:
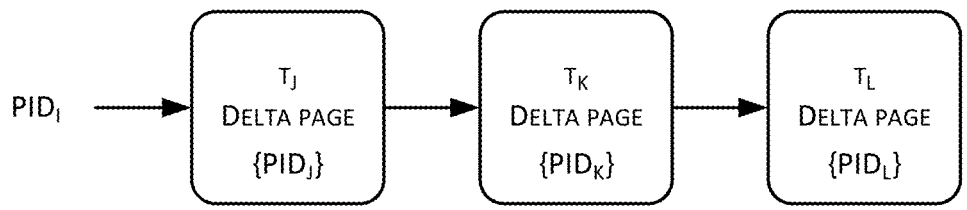
FIGS. 4A-4C illustrate example page mapping change scenarios.
Figure 4B:
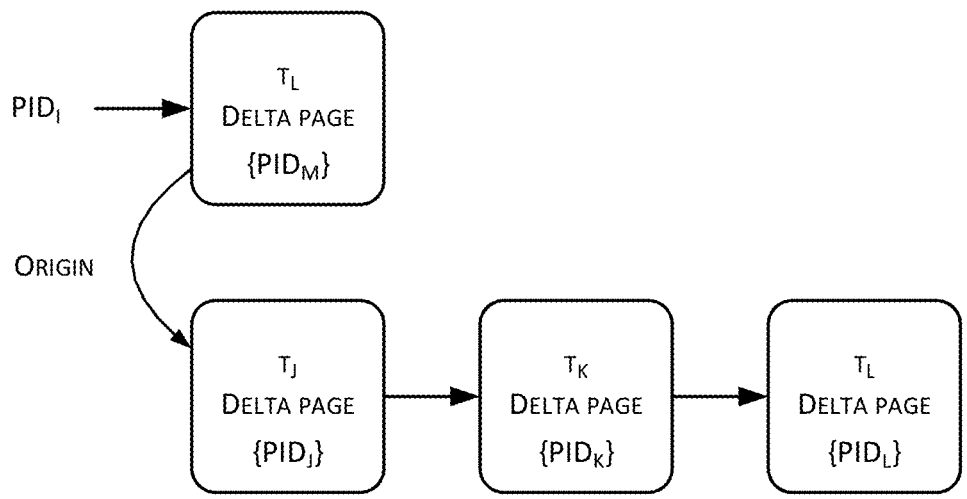
Figure 4C:
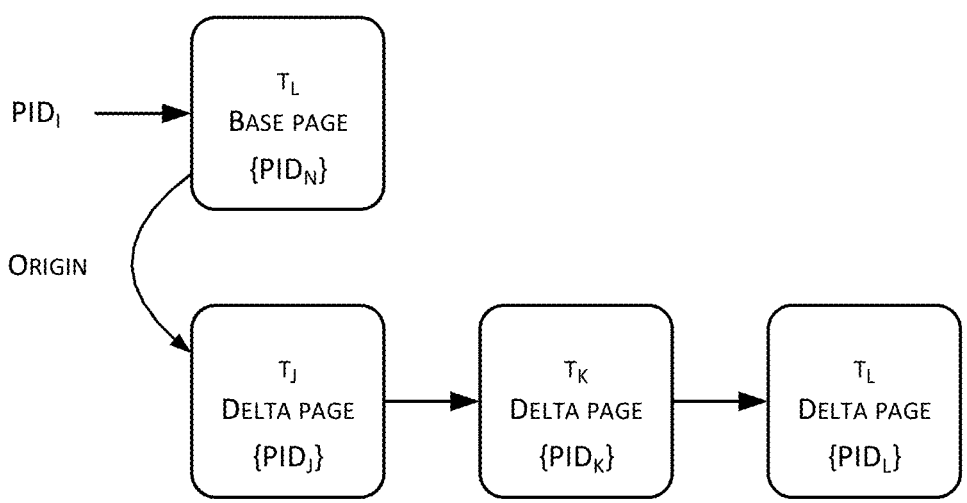

In implementations, the key-value engine 104 may perform a plurality of different operations on page mappings or the page mapping data structure 308 when performing user checkpoint or page compaction. FIGS. 4A-4C illustrate example page mapping change scenarios. In implementations, the key-value engine 104 may flush or write data from a memory buffer 306 into the delta page stream 316 during a user checkpoint operation. If multiple versions of a certain key exist in the page mapping data structure 308, the key-value engine 104 may only keep or maintain a most recent or latest version of this key. In implementations, the key-value engine 104 may locate a corresponding host page for each key, and write key-value pairs that belong to a same host page together as a delta page into the delta page stream 316. In implementations, the key-value engine 104 may further add or append a physical page identifier of the delta page into the page mapping data structure 308. In implementations, the key-value engine 104 may perform or process multiple user checkpoints in parallel to reduce the processing cost (such as the total processing time) of these multiple user checkpoints.

For example, a physical page identifier (i.e., $PID_i$) of a certain host page may appear in a parent of that page, and such page may have one or more delta pages with corresponding physical page identifiers (e.g., a chain of 3 delta pages having physical page identifiers $PID_j$, $PID_k$, and $PID_l$ respectively in FIG. 4A) accumulated or obtained from one or more user checkpoints at corresponding timestamps (e.g., timestamps $t_j$, $t_k$, and $t_l$, with $t_j < t_k < t_l$ in FIG. 4A). In implementations, actual or latest content of this host page is a combined view from respective contents of the host page and the one or more delta pages (e.g., pages corresponding to $PID_i$, $PID_j$, $PID_k$, and $PID_l$ in FIG. 4A).

In implementations, the key-value engine 104 may determine whether a number of delta pages corresponding to the host page is greater than or equal to a predetermined number threshold (e.g., 3, 4, 5, etc.). In response to determining that the number of delta pages corresponding to the host page is greater than or equal to the predetermined number threshold, the key-value engine 104 may perform compaction for the host page, i.e., compacting or combining the one or more delta pages of the host page into a single delta page, in a system transaction, e.g., a system transaction at timestamp $t_m$ (with $t_l < t_m$). In implementations, the key-value engine 104 may set or determine a value for the number threshold based on one or more factors, which may include, but are not limited to, costs of reads and writes for an increasing number of delta pages, a memory budget such as a memory overhead for each delta page, etc.

Additionally, in implementations, the key-value engine 104 may further determine a ratio between a total memory size of the one or more delta pages and a memory size of a base page of the host page, and determine whether such ratio is greater than or equal to a predetermined ratio threshold (e.g., 25%, 30%, etc.). In implementations, the key-value engine 104 may perform compaction on the one or more delta pages of the host page (i.e., partial consolidation), or perform compaction on the base page and the one or more delta pages of the host page (i.e., overwrite) based on whether the ratio between the total memory size of the one or more delta pages and the memory size of the base page of the host page is greater than or equal to the predetermined ratio threshold. A size of a delta page is usually much smaller than a size of a base page. In implementations, the key-value engine 104 may set or determine a value for the predetermined ratio threshold based on, for example, all allowable or acceptable degree of write amplification. In implementations, write amplification is an undesirable phenomenon associated with solid state storage devices (such as the storage device 212), where an actual amount of information or data that is physically written to a storage media is a multiple of a logical amount intended to be written.

In implementation, when the ratio between the total memory size of the one or more delta pages and the memory size of the base page of the host page is less than the predetermined ratio threshold, the key-value engine 104 may perform partial consolidation, i.e., performing compaction on the one or more delta page of the host page without the base page of the host page, to avoid excessive write amplification when the ratio is less than the predetermined ratio threshold. For example, FIG. 4B shows an example scenario when the key-value engine 104 compacts or combines the delta pages corresponding to $PID_j$, $PID_k$, and $PID_l$ into a new delta page with a physically page identifier $PID_m$ through a system transaction with a timestamp $t_m$. In this example, the new delta page identified by $PID_m$ has the largest timestamp (i.e., $t_l$) of the delta pages being compacted or combined. Content of this host page is a combined view from pages identified by $PID_i$ and $PID_m$.

In implementations, a pointer may further be added to link the new delta page to the delta pages that are compacted or combined to form the new delta page. For example, FIG. 4B shows a pointer called Origin that links the new delta page identified by $PID_m$ to the delta pages identified by $PID_j$, $PID_k$, and $PID_l$. In implementations, when a snapshot query as of timestamp $t_k$ comes to $PID_i$ and finds that a timestamp of $PID_m$ is $t_l$, which is larger than $t_k$, the key-value engine 104 may follow the pointer Origin of $PID_m$ is followed to search for a suitable page for answering such snapshot query. In other words, the key-value engine 104 may employ this Origin pointer to support a snapshot query that has an old timestamp (i.e., older than the timestamp of $PID_m$, for example, in this example of FIG. 4B). If snapshot queries having timestamps older than $t_l$ are all processed and completed, the key-value engine 104 may further deallocate page mapping entries for $PID_j$, $PID_k$, and $PID_l$.

In implementations, when the ratio between the total memory size of the one or more delta pages and the memory size of the base page of the host page is greater than or equal to the predetermined ratio threshold, the key-value engine 104 may perform compaction on the one or more delta page and the base page of the host page to form a new base page that replaces or overwrite the old base page. For example, FIG. 4C shows an example scenario when the key-value engine 104 compacts or combine the pages identified by $PID_i$, $PID_j$, $PID_k$, and $PID_l$ into a new base page $PID_n$, which has the largest timestamp (i.e., $t_l$) of the delta pages that are compacted or combined. In this case, the key-value engine 104 may obtain content of the host page solely from the new base page identified by $PID_n$.

In implementations, a pointer may further be added to link the new base page to the delta pages that are compacted or combined with the old base page to form the new base page. For example, similar to the case shown in FIG. 4B, FIG. 4C also shows a pointer called Origin that links the new base page identified by $PID_n$ to the delta pages identified by $PID_j$, $PID_k$, and $PID_l$. In implementations, when a snapshot query as of timestamp $t_k$ comes to $PID_i$ and finds that a timestamp of $PID_n$ is $t_l$, which is larger than $t_k$, the key-value engine 104 may follow the pointer Origin of $PID_n$ is followed to search for a suitable page for answering such snapshot query. In other words, the key-value engine 104 may employ this Origin pointer to support a snapshot query that has an old timestamp (i.e., older than the timestamp of $PID_n$, for example, in this example of FIG. 4C). If snapshot queries having timestamps older than $t_l$ are all processed and completed, the key-value engine 104 may further deallocate page mapping entries for $PID_j$, $PID_k$, and $PID_l$.

Example Garbage Collection

As described in the foregoing description, the key-value engine 104 may commit storage usage (such as data changes and additions made by user transactions, for example) through system transactions, and derive usage history from changes made to the page mapping data structure 308. In the page mapping data structure 308, when page identifiers (i.e., PIDs) are pointed to via a dedicated pointer (such as the Origin pointer shown in FIGS. 4B and 4C), pages corresponding to these page identifiers may eventually be no longer needed and become garbage when no active transactions depend on these pages, e.g., no active transactions access or query data in these pages. In implementations, if a system failure (such as a system crash, a system malfunction, an abrupt shutdown, etc.) occurs in the key-value engine 104 or the storage system 102 when the key-value engine 104 writes certain pages into storage (such as the storage device 212) in a system transaction, and such system transaction is not committed (i.e., no log record is persisted or successfully stored for associated page mapping updates of these pages) before the system failure occurs, these pages may be counted or treated as garbage.

In implementations, the key-value engine 104 may perform garbage collection for the tree or hierarchical data structure (such as a B+ tree, etc.) on the storage device 212 (such as an append-only storage device, for example, a solid state storage device, as described in the foregoing description) with page mappings. In implementations, the key-value engine 104 may separate hot and cold data to reduce write amplification, track extent usage using a restricted or limited amount of memory, efficiently answer queries of valid extent usage, and adaptively or selectively defragment pages in snapshots in rounds of garbage collection.

In implementations, the key-value engine 104 may place or store delta pages into the delta page stream 316, and place or store base pages into the base page stream 318. Since delta pages are relatively short-lived and tend to be small in size as compared to base pages, such separation of hot data from cold data (i.e., separation of delta pages from base pages) may reduce write amplification that may be induced by garbage collection, because an amount of valid data that needs to be relocated is reduced. In implementations, the key-value engine 104 may set or determine a predetermined extent threshold, and may determine whether a sealed extent is a candidate for garbage collection based on whether a garbage ratio of the sealed extent is greater than or equal to the predetermined garbage collection threshold. For example, if a garbage ratio of a certain sealed extent is greater than or equal to the predetermined garbage collection threshold, the key-value engine 104 may determine that this sealed extent is a candidate for garbage collection, and remove or clear this sealed extent at a next garbage collection operation. In implementations, due to different characteristics of delta pages and base pages as described above, the key-value engine 104 may set different garbage collection thresholds for extents in the delta page stream 316 and extents in the base page stream 318. For example, the key-value engine 104 may set a higher garbage collection threshold for extents in the delta page stream 316 as compared to a garbage collection threshold for extents in the base page stream 318. In implementations, the key-value engine 104 may sort candidate extents for garbage collection based on respective garbage ratios, and perform garbage collection for these candidate extents in a descending order of the respective garbage ratios.

In implementations, garbage collection may be completed in system transactions, similar to user checkpoint and page compaction. By way of example and not limitation, in a system transaction, the key-value engine 104 may check a snapshot of the underlying tree or hierarchical structure (such as a B+ tree, for example) with delta pages as of a commit timestamp, decide which pages on an extent as of this snapshot are still valid, relocate valid pages on the extent to a tail of the delta page stream 316 or the base page stream 318 based on whether the pages are delta pages or base pages, write a log record to commit the system transaction, and apply changes to the page mapping data structure 308.

In implementations, to facilitate snapshot queries of extent usages for garbage collection, the key-value engine 104 may further track a usage history for each extent by maintaining an extent usage data structure in the memory 208 (or called an in-memory data structure, ExtentUsage), for example. In implementations, the extent usage data structure may be in any appropriate form, such as a table, etc., and may be used to capture or indicate which portions of each extent includes valid data. In implementations, the extent usage data structure may include a plurality of fields, which may include, but are not limited to, a start system timestamp (or abbreviated as StartSysTimestamp), a snapshot system timestamp (or abbreviated as SnapshotSysTimestamp), a snapshot usage physical page identifier (or abbreviated as SnapshotUsagePID), a valid size (or abbreviated as ValidSize), valid ranges (or abbreviated as ValidRanges), and a usage log (or abbreviated as UsageLog).

In implementations, the start system timestamp (i.e., StartSysTimestamp) may represent a timestamp of a system transaction that is the first system transaction to commit a write into this extent. The valid size (i.e., ValidSize) may be used to track a size of all valid data in the extent as of the snapshot system timestamp (i.e., SnapshotSysTimestamp). In implementations, the valid ranges (i.e., ValidRanges) may be in a form of a vector, a list, an array, etc., such as a vector of ranges (i.e., vector<Range>), for example. Each member of the valid ranges may give an extent usage snapshot, and represent a continuous region of valid data. The usage log (i.e., UsageLog) may be a usage history after the snapshot system timestamp (i.e., SnapshotSysTimestamp), and may be in a form of a list, an array, etc., such as a list of incremental usages (i.e., list<IncrementalUsage>), for example. In implementations, each incremental usage (i.e., IncrementalUsage) may record usage changes on the extent using a plurality of information, which may include, for example, a system timestamp, an incremental size, and one or more valid ranges that are added or removed, etc. By way of example and not limitation, each incremental usage (i.e., IncrementalUsage) may be represented as (SysTimestamp, IncrementalSize, +vector<Range>, −vector<Range>).

In implementations, when the usage log is too long (e.g., a range count, i.e., the number of (added and/or removed) valid ranges included in the usage log, is greater than or equal to a predetermined count threshold), the key-value engine 104 may collapse a historical portion that is no longer needed by garbage collection a snapshot as of the snapshot system timestamp (i.e., SnapshotSysTimestamp). In implementations, the key-value engine 104 may perform this collapse through a system transaction (which is called a UsageTrackingCompaction system transaction), to help reducing a memory size of the extent usage data structure (i.e., ExtentUsage). For example, if an extent has a valid range snapshot $[R_1, R_2]$ at timestamp $t_1$, followed by a history of $+[R_2+1, R_3]$ at timestamp $t_2$, $+[R_3+1, R_4]$ at timestamp $t_3$ and $-[R_1, R_5]$ at timestamp $t_4$. The key-value engine 104 may collapse these valid range snapshots as of timestamp $t_4$ to obtain a new valid range snapshot $[R_5, R_4]$.

As delta pages are normally small in size, an amount of memory usage for tracking the delta pages may be significant as compared to the sizes of the delta pages. Furthermore, delta pages may appear in multiple chains of delta pages (or simply called delta chains), which may undoubtedly further complicate the bookkeeping of the change history of usage of extents. In implementations, in order to reduce the amount of memory usage for tracking delta pages and to reduce the complexity of bookkeeping of the change history of usage of extents, the key-value engine 102 may track only valid sizes for extents in the delta page stream 316.

Furthermore, as base pages tend to be large in size and do not appear in multiple chains, in implementations, the key-value engine 102 may track the change history of both valid offsets and sizes for extents in the base page stream 318. In implementations, to further reduce the memory usage, when a range count (i.e., the number of (added and/or removed) valid ranges) after collapse is still greater than or equal to a predetermined count threshold for an extent in the base page stream 318, the key-value engine 104 may perform a system transaction (e.g., a UsageTrackingCompaction system transaction) to spill or write valid ranges as a special page (which is called a snapshot usage page or SnapshotUsagePage) into the base page stream 318, record or identify a location of the snapshot usage page as a snapshot usage page identifier (i.e., SnapshotUsagePID), and modify the extent usage data structure (i.e., ExtentUsage) to reflect removed usages of on-storage valid ranges and added usages of the spilled valid ranges.

In implementations, when performing garbage collection for an extent (e.g., an extent in the delta page stream 316 or the base page stream 318), the key-value engine 104 may first relocate valid pages in the extent to the tail of a corresponding data stream (i.e., the delta page stream 316 or the base page stream 318 to which the extent belongs), while skipping garbage (i.e., pages that are invalid or no longer needed in the extent). In implementations, the key-value engine 104 may further choose to consolidate fragmented pages along with garbage collection by potentially relocating an entire page mapping chain. In implementations, page mapping chains may be located differently for bases pages and delta pages. When a base page is written into the base page stream 318, the key-value engine 104 may embed a mapping page identifier (or called MappingPID) in a header of the base page. For example, in FIG. 4C, $PID_i$ is a mapping page identifier of $PID_n$. In implementations, if a base page has a page identifier $PID_{base}$, and a page mapping chain including $PID_{base}$ exists in the page mapping data structure 308, the key-value engine 104 may find and locate such chain by searching either $PID_{base}$ or a mapping page identifier of the base page. A delta page may appear in multiple page mapping chains. In this case, the key-value engine 104 may find and locate the delta page, for example, by scanning the page mapping data structure 308 for a page identifier of the delta page.

In implementations, when performing page defragmentation, the key-value engine 104 may employ partial consolidation to reduce write amplification. In implementations, the key-value engine 104 may determine whether a base page is located in an extent which is a candidate for garbage collection. Additionally, if the base page is located in an extent which is not a candidate for garbage collection, the key-value engine 104 may further determine a total page size of delta pages that are associated with the base page and have respective timestamps that are not newer or larger than a snapshot read timestamp for a garbage collection system transaction (i.e., a system transaction for garbage collection). The key-value engine 104 may determine whether a ratio between the total page size of such delta pages and a page size of the base page is less than a predetermined ratio threshold.

In implementations, if the base page is located in an extent which is not a candidate for garbage collection and the ratio between the total page size of these delta pages and the page size of the base page is less than the predetermined ratio threshold, the key-value engine 104 may choose to perform partial consolidation to merge or combine these delta pages to obtain a new delta page, and replace these delta pages with the new delta page in the delta page stream 316. Otherwise, the key-value engine 104 may merge or combine the base page and the delta pages to obtain a new base page, and replace the old base page by the new base page in the base page stream 318.

Figure 5A:
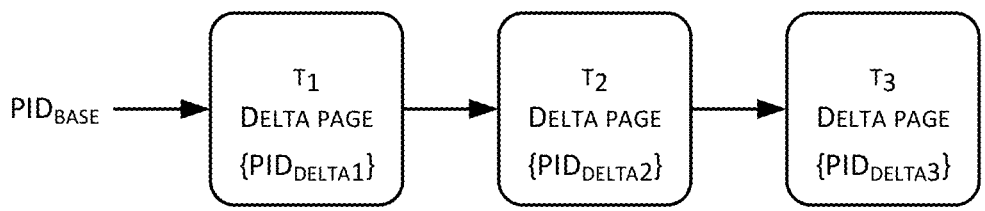
FIGS. 5A-5C illustrate example page mapping change scenarios after page defragmentation.
Figure 5B:
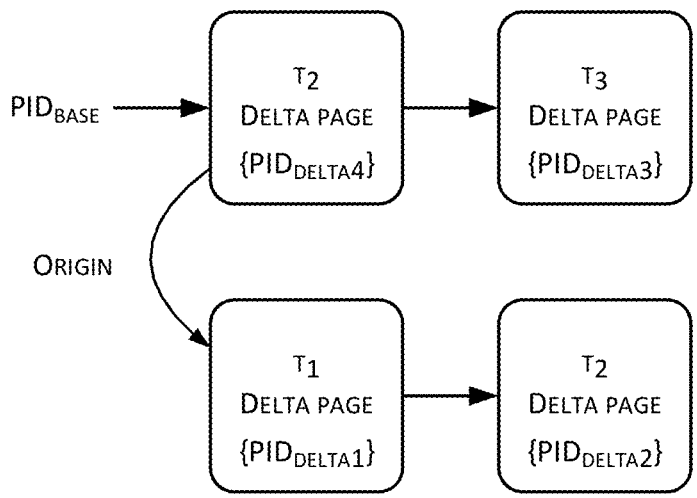
Figure 5C:
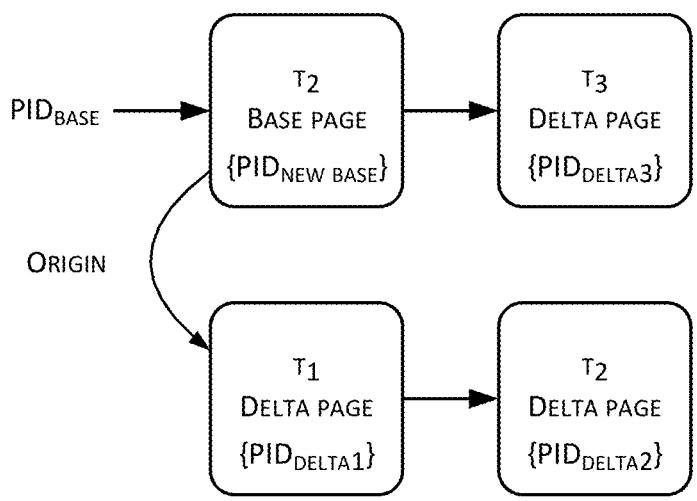

For example, FIGS. 5A-5C illustrate example page mapping change scenarios for page defragmentation. FIG. 5A shows an example page mapping scenario prior to relocating a base page identified by $PID_{base}$. In this example, a snapshot read timestamp for a garbage collection system transaction (i.e., a system transaction for garbage collection) is $t_2$. If a base page identified by $PID_{base}$ is located in an extent which is not a candidate for garbage collection and a ratio between a total page size of delta pages which have timestamps that are not newer or larger than the snapshot read timestamp for this garbage collection system transaction (e.g., delta pages identified by $PID_{delta1}$ and $PID_{delta2}$ and having timestamps $t_1$ and $t_2$ as shown in FIG. 5A, while a delta page identified by $PID_{delta3}$ has a timestamp $t_3$ that is newer or larger than the snapshot read timestamp $t_2$ and thus is not included) and a page size of the base page identified by $PID_{base}$ is less than a predetermined ratio threshold, the key-value engine 104 may perform partial consolidation, with the delta pages identified by $PID_{delta1}$ and $PID_{delta2}$ being merged and replaced by a newly written delta page identified by $PID_{delta4}$ in the delta page stream 316, as shown in FIG. 5B. Otherwise, the key-value engine 104 may merge or combine the base page identified by $PID_{base}$ and the delta pages identified by $PID_{delta1}$ and $PID_{delta2}$ (the delta page identified by $PID_{delta3}$ has the timestamp that is newer or larger than the snapshot read timestamp $t_2$ and thus is not included), and replace the old base page identified by $PID_{base}$ by a newly written base page $PID_{new\ base}$ in the base page stream 318, as shown in FIG. 5C.

In implementations, the key-value engine 104 may further maintain a global garbage collection snapshot timestamp (or abbreviated as GCSnapshotTimestamp), which keeps moving forward with advancing or new rounds of garbage collection (GC). In implementations, the key-value engine 104 may complete each round of garbage collection in a garbage collection system transaction. In implementations, the key-value engine 104 may use a current value of the global garbage collection snapshot timestamp as a snapshot read timestamp of a current garbage collection system transaction, and query a total valid data size of each extent, in order to decide or determine extent candidates for a current round of garbage collection to be processed in the garbage collection system transaction. In implementations, the key-value engine 104 may conduct and answer such query by searching the in-memory extent usage data structure (i.e., ExtentUage) only. In implementations, the key-value engine 104 may remove or clear any sealed extent with zero valid size, if a start system timestamp (i.e., StartSysTimestamp) associated with that sealed extent is not newer or larger than GCSnapshotTimestamp. After one or more extents are determined to be candidates for garbage collection, the key-value engine 104 may find and determine valid ranges of these extents as of the snapshot read timestamp of the current garbage collection system transaction.

In implementations, for each candidate extent in the base page stream 318, the key-value engine 104 may search the in-memory extent usage data structure (i.e., ExtentUsage), and combine a search result with valid ranges that are located by snapshot usage physical page identifiers in the base page stream 318. For candidate extents in delta page stream 316, the key-value engine 104 may scan the page mapping data structure 308, for example, only once, to construct valid ranges as of the snapshot read timestamp of the current garbage collection system transaction, and locate one or more page mapping chains that include valid delta pages.

In implementations, the key-value engine 104 may load data included in each valid range into the memory 208, and identify one or more valid pages. For each valid page, the key-value engine 104 may further relocate one or more page mapping chains that include the valid page. In this case, the valid page may or may not be partially defragmented. During garbage collection of an extent in the base page stream 318, the key-value engine 104 may encounter one or more snapshot usage pages (i.e., SnapshotUsagePages). In this case, the key-value engine 104 may relocate the one or more snapshot usage pages individually for the extent, and update respective snapshot usage physical page identifiers (i.e., SnapshotUsagePID) of the one or more snapshot usage pages in the extent usage data structure (i.e., ExtentUsage) updated accordingly. In implementations, the key-value engine 104 may further capture changes to the page mapping data structure 308 and the extent usage data structure in a log record of the garbage collection system transaction, and apply these changes when the garbage collection system transaction is committed.

Example Restart Recovery

As described in the foregoing description, the key-value engine 210 may take or generate user checkpoints and system checkpoints periodically and/or on demand during normal execution or operation. In implementations, after a memory buffer is sealed, the key-value engine 210 may write or flush data (such as data changes made or caused by user transactions, etc.) in the memory buffer into the delta page stream 316 by performing a user checkpoint system transaction (i.e., taking a user checkpoint), and create a corresponding system transaction log record. In implementations, the corresponding system transaction log record may include, but is not limited to, user transaction replay starting information (or called UserTxReplayStartInfo). In implementation, the user transaction replay starting information may include, for example, a current minimal uncommitted user transaction timestamp (or called MinUncommittedUserTxTimestamp) and a user transaction replay starting point (or called UserTxReplayStartPoint). In implementation, user transaction replay starting point may be used to define a starting position from which the storage system 102 recovers corresponding data of the user transaction log 310 during a restart recovery, and define truncation upper boundary of the user transaction log 310 after the user checkpoint is taken.

In implementations, when a size or length of the system transaction log 312 reaches a predetermined size threshold, the key-value engine 210 may write or take a system checkpoint. In implementations, the system checkpoint may include, but is not limited to, current content of the page mapping data structure 308 at a current system transaction timestamp (or referred to as SysCheckpointTimestamp) that is obtained from the system transaction timestamp generator, a system transaction replay starting point (or referred to as SysTxReplayStartPoint) which is a starting position in the system transaction log for system transactions with respective timestamps larger or later than SysCheckpointTimestamp, and user transaction replay starting information (i.e., UserTxReplayStartInfo) for a most recent or latest user checkpoint. In implementations, the system transaction replay starting point (i.e., SysTxReplayStartPoint) may be used to define a starting position from which the storage system 102 recovers corresponding data of the system transaction log 310 during a restart recovery, and define a truncation upper boundary of the system transaction log 312 after the system checkpoint is taken. In implementations, the key-value engine 210 may record a storage location or address of the system checkpoint in the metadata log 314.

In implementations, after a system failure (such as a system crash, an abnormal system shutdown due to power loss, etc.), the storage system 102 may need to perform a restart recovery to restore a system state of the storage system 102 prior to the system failure. In implementations, the storage system 102 may restart the system, and recover data (such as data changes, for example) generated by user transactions that have been committed immediately prior to the system failure or the abrupt shutdown. In implementations, the storage system 102 (or the key-value engine 210) may perform a restart recovery to recover the data (such as the data changes, for example) generated by the user transactions that have been committed immediately prior to the system failure or the abrupt shutdown.

In implementations, at a system start after the system failure, if the storage system 102 is found to be in an inconsistent state or not been shut down properly, the storage system 102 may perform restart recovery to re-apply all transactions that are already committed but whose changes were not yet materialized in the storage system 102. In implementations, the storage system 102 may also review one or more logs (such as the user transaction log 310, the system transaction log 312, and the metadata log 314) for uncommitted transactions and roll back any data changes that are made by these transactions to ensure atomicity and durability of the transactions, and to bring the storage system 102 back to a consistent state that can start serving new transactions.

In implementations, when the storage system 102 is restarted, the key-value engine 210 may read the metadata log 314 to locate the most recent or latest system checkpoint recorded in the metadata log 314 prior to the system failure. In implementations, the key-value engine 210 may locate the most recent or latest system checkpoint by determining the largest or latest timestamp among the system checkpoints recorded in the metadata log 314. Additionally or alternatively, the key-value engine 210 may locate the most recent or latest system checkpoint by sequentially reading data in the metadata log 314 from the end or tail of the metadata log 314 and using a system checkpoint that is first encountered (i.e., the last entry of system checkpoint recorded in the metadata log 314 prior to the system failure) as the most recent or latest system checkpoint.

In implementations, after locating the most recent or latest system checkpoint, the key-value engine 210 may read or load content of a page mapping data structure included in the most recent or latest system checkpoint. In implementations, the key-value engine 210 may replay the system transaction log 312 starting from a system transaction replay starting point included in the most recent or latest system checkpoint to apply changes to the page mapping data structure that is loaded from the most recent or latest system checkpoint. In this example, since a tree or hierarchical structure (such as a B+ tree) is used for facilitating storage and retrieval of key-value pairs, a page identifier (or abbreviated as PID) of a root page of the tree or hierarchical structure (such as a B+ tree) may be included in the system checkpoint records 320 and recorded in system transaction log records in the system transaction log 312 when the page identifier is changed. Therefore, during the restart recovery, the page identifier of the root page of the tree or hierarchical structure may also be recovered when the key-value engine 210 replays the system transaction log 312.

In implementations, when the key-value engine 210 replays the system transaction log 312, newer log records for user checkpoints may also be encountered. In this case, the key-value engine 210 may further obtain additional information from a most recent or latest user checkpoint log record. The additional information may include, but is not limited to, user transaction replay starting information (or called UserTxStartInfo), a minimal uncommitted user transaction timestamp (or called MinUncommittedUserTxTimestamp), a user transaction replay starting point (or called UserTxReplayStartPoint), etc. In implementations, the key-value engine 210 may further replay the user transaction log 310 starting from the user transaction replay starting point (i.e., UserTxReplayStartPoint) included in the additional information obtained from the most recent or latest user checkpoint log record, while skipping any user transactions with a timestamp that is smaller or earlier than the minimal uncommitted user transaction timestamp (i.e., MinUncommittedUserTxTimestamp).

Figure 6:
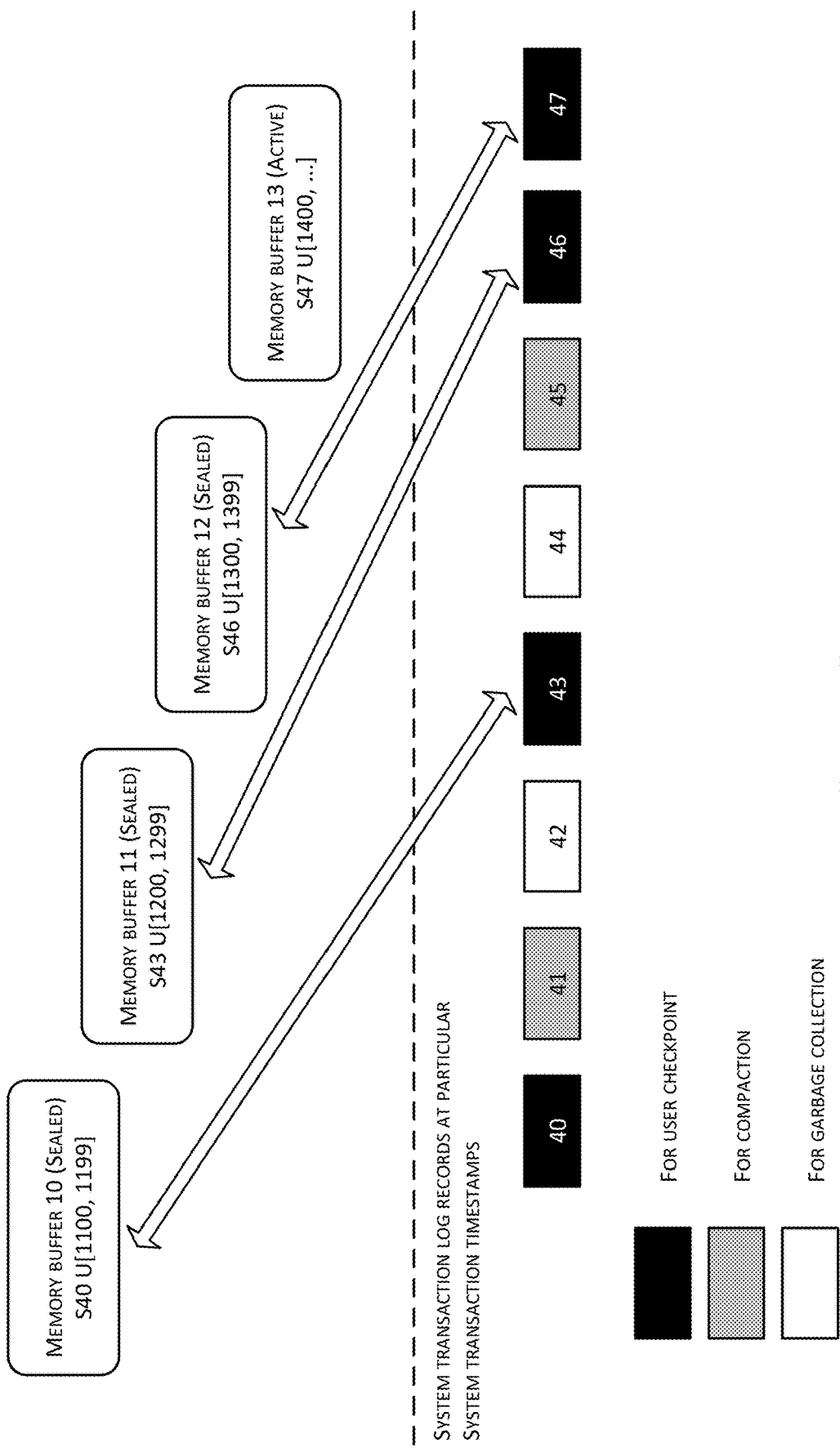
FIG. 6 illustrates an example scenario during normal execution and restart recovery.

By way of example and not limitation, FIG. 6 illustrates an example scenario during normal execution and restart recovery. FIG. 6 shows four memory buffers, namely, a memory buffer 10, a memory buffer 11, a memory buffer 12, and a memory buffer 13. The memory buffer 10 is sealed, and includes data (such as data changes) caused or made by user transactions taken at a system transaction timestamp of 40 (i.e., S40 as shown in FIG. 6) and user transaction timestamps between 1100 and 1199 (i.e., U[1100, 1199] as shown in FIG. 6). The memory buffer 11 is sealed, and includes data (such as data changes) caused or made by user transactions taken at a system transaction timestamp of 43 (i.e., S43 as shown in FIG. 6) and user transaction timestamps between 1200 and 1299 (i.e., U[1200, 1299] as shown in FIG. 6). The memory buffer 12 is sealed, and includes data (such as data changes) caused or made by user transactions taken at a system transaction timestamp of 46 (i.e., S46 as shown in FIG. 6) and user transaction timestamps between 1100 and 1199 (i.e., U[1300, 1399] as shown in FIG. 6). The memory buffer 13 is active, and includes data (such as data changes) caused or made by user transactions taken at a system transaction timestamp of 47 (i.e., S47 as shown in FIG. 6) and user transaction timestamps starting from 1400 (i.e., U[1400, . . . ] as shown in FIG. 6). In this example, FIG. 6 also shows 7 system transaction log records taken at different system transaction timestamps from 40 to 46, and correspond to different operations or system transactions (such as system transactions for user checkpoint, system transactions for compaction, system transactions for garbage collection, etc.).

In this example of FIG. 6, a system checkpoint is successfully taken at a system transaction timestamp of 44 during normal execution. A system failure occurs some time after the system transaction timestamp of 44. In this case, when the storage system 102 is restarted, the key-value engine 210 may find and obtain the most recent or latest system checkpoint that is taken and recorded in the metadata log 314 prior to this system failure to be the system checkpoint taken at the system transaction timestamp of 44. Accordingly, the key-value engine 210 may replay the system transaction log 312 starting from a system transaction replay starting point included in the system checkpoint taken at the system transaction timestamp of 44. As shown in FIG. 6, the most recent or latest user checkpoint is taken and recorded at the system transaction timestamp of 43 prior to the system failure. When the key-value engine 210 continues to replay the system transaction log 312, a new user checkpoint (i.e., a new user checkpoint system transaction log record) is encountered at a system transaction timestamp of 46. In this example, such new user checkpoint (or the new user checkpoint system transaction log record) is said to include a minimal uncommitted user transaction timestamp of 1300, and a user transaction replay starting point, i.e., (MinUncommittedUserTxTimestamp=1300, UserTxReplayStartPoint). In this case, the key-value engine 210 may replay the user transaction log 310 starting from the user transaction replay starting point, while skipping any user transactions with a timestamp that is smaller or earlier than the minimal uncommitted user transaction timestamp (i.e., 1300 in this example).

Example Read-Only Replica Continuous Recovery

In implementations, the key-value engine 210 may maintain one or more read-only replicas on a same copy of file streams by continuously replaying the system transaction log 312 and if needed, the user transaction log 310. In implementations, the key-value engine 210 may create or maintain a plurality of read-only replicas on a same copy of file streams to facilitate data reading by multiple read requests or read-only user transactions and to improve the speed of parallel processing of such read requests or read-only user transactions. This is especially true when a large number of read requests or read-only user transactions may exist after restart recovery. In implementations, the storage system 102 may replicate content of a primary database or file library across storage components (e.g., storage devices 212) of the storage system 102. While relative physical storage locations may be different, data in replicated database or file library is exactly the same as in the primary database or file library. A read-only replica of a database or file library can function to serve read requests or provides a starting point of a fast recovery. In implementations, in order to create or generate read-only replicas of file streams, the key-value engine 210 may perform restart recovery with the file streams opened in a read-only mode, while the tail of the user transaction log 310 may be skipped. After the restart recovery is performed, the key-value engine 210 may continue to replay the system transaction log 312 to ensure the page mapping data structure 308 in the memory 208 to be up to date. For the sake of description, a read-only replica is described hereinafter. Nevertheless, the following description can be generalized for cases where multiple read-only replicas exist.

In implementations, the key-value engine 210 may accept queries (or user transactions that do not change data) from users (such as users of the client devices 114), obtain latest snapshots of a read-only replica, and process the queries using these latest snapshots as replaying the system transaction log 312 (and the user transaction log 310 if needed) advances. In implementations, the key-value engine 210 may further report a replay progress of the system transaction log 312 (and the user transaction log 310 if needed) and a minimal snapshot read system timestamp (or referred to as MinSnapshotReadSysTimestamp) of user transactions on a read-only replica of a file stream to a corresponding writable replica of the file stream. In implementations, the key-value engine 210 may ensure a truncation point of the system transaction log 312 on the writable replica does not advance beyond the replay progress of the read-only replica.

In implementations, in order to allow more up-to-date reads of a read-only replica, the key-value engine 210 may further replay the user transaction log 310 simultaneously for the read-only replica to apply data changes into a memory buffer 306. In implementations, in order to support snapshot queries across the memory buffers and on-storage tree or hierarchical structure (such as the on-storage Bw-tree) that are restored by replaying the system transaction log 312, the key-value engine 210 may split or divide read-write user transactions into memory buffers 306 in the same way as that on the writable replica when the key-value engine 210 replays the user transaction log 310. For example, when a new memory buffer 306 is opened for the writable replica, the key-value engine 210 may write a memory buffer opening log record (or referred to as a MemoryBufferOpen log record) into the user transaction log 310 to record a memory buffer timestamp (or referred to as MemoryBufferTimestamp) and a maximum timestamp among timestamps of user transactions included in previous memory buffers that are opened prior to the memory buffer 306. Based on MemoryBufferOpen log records, the key-value engine 210 may determine one or more memory buffers to which data changes associated with user transactions are applied when the key-value engine 210 replays the user transaction log 310.

In implementations, when the system transaction log 312 and the user transaction log 310 are replayed (for example, simultaneously or concurrently), the key-value engine 210 may allow read-only replica to maintain two timestamps, namely, a maximal committed system transaction timestamp (or referred to as MaxCommittedSysTxTimestamp) and a minimal uncommitted user transaction timestamp (or referred to as MinUncommittedUserTxTimestamp). In implementations, the key-value engine 210 may set or assign a snapshot read timestamp of a read-only user transaction based on current values of MaxCommittedSysTxTimestamp and MinUncommittedUserTxTimestamp, for example, (MaxCommittedSysTxTimestamp, MinUncommittedUserTxTimestamp−1).

In implementations, on the writable replica, user transaction log records may be generated earlier than a system transaction log record for a user checkpoint that includes data changes of user transactions included in the user transaction log records. Thus, in most cases, the key-value engine 210 may replay the user transaction log 310 (i.e., UserTransactionLog) ahead of a corresponding part of the system transaction log 312 (i.e., SystemTransactionLog), and the key-value engine 210 may answer a query with more up-to-date data changes from the memory buffers 306. In cases when user transaction log 310 is replayed behind the system transaction log 312, the key-value engine 210 may answer a query without reading from any memory buffers 306.

For example, as shown in FIG. 6, if a progress of replaying the system transaction log 312 has reached a system transaction timestamp of 46 and a progress of replaying the user transaction log 310 has only reached a user transaction timestamp of 1180 at a memory buffer (i.e., the memory buffer 10 in FIG. 6), the key-value engine 210 may answer a query based on the replay progress of the system transaction log 312, i.e., effectively using a snapshot of a user transaction timestamp (i.e., UserTxTimestamp) of 1299 which is equivalent to a system transaction timestamp (i.e., SysTxTimestamp) of 46.

In implementations, the key-value engine 210 may delete or remove one or more memory buffers and page mapping entries on a read-only replica periodically or on demand. In implementations, deletion or removal of one or more memory buffers and page mapping entries on a read-only replica may be gated or decided by a minimal snapshot read system timestamp (i.e., MinSnapshotReadSysTimestamp) of user transactions, which is a local decision individually or independently made for that read-only replica. In implementations, the key-value engine 210 may convert or promote a read-only replica into a writable replica by replaying the system transaction log 312 and the user transaction log 310 to catch up all data changes that are made and recorded in the system transaction log 312 and the user transaction log 310.

Example Methods

Figure 7:
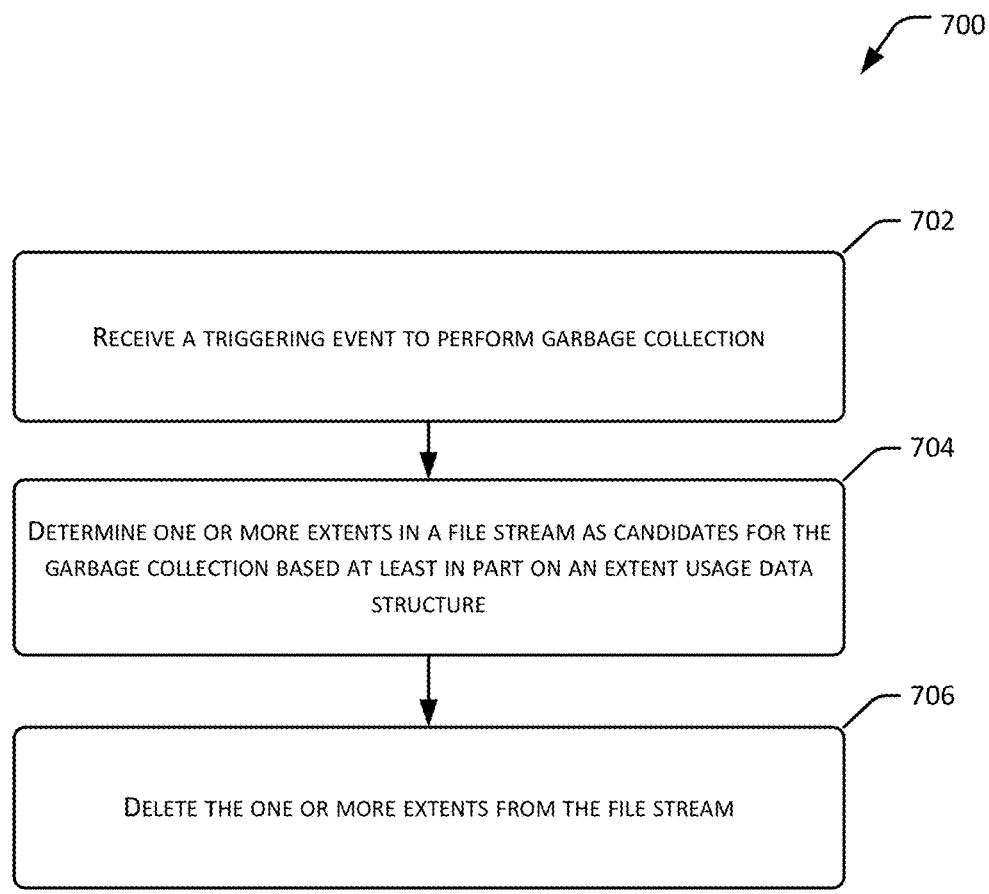
FIG. 7 illustrates an example garbage collection method.
Figure 8:
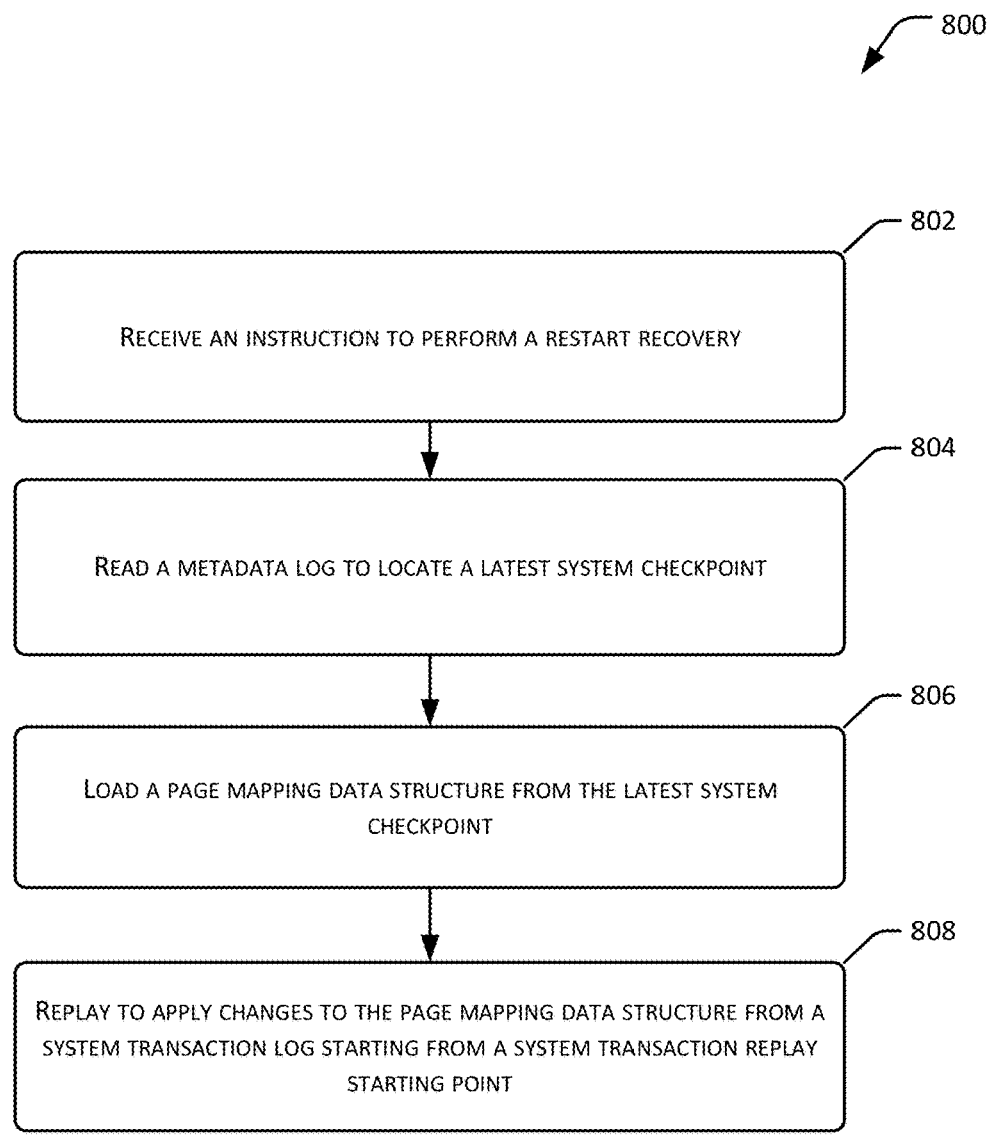
FIG. 8 illustrates an example restart recovery method.
Figure 9:
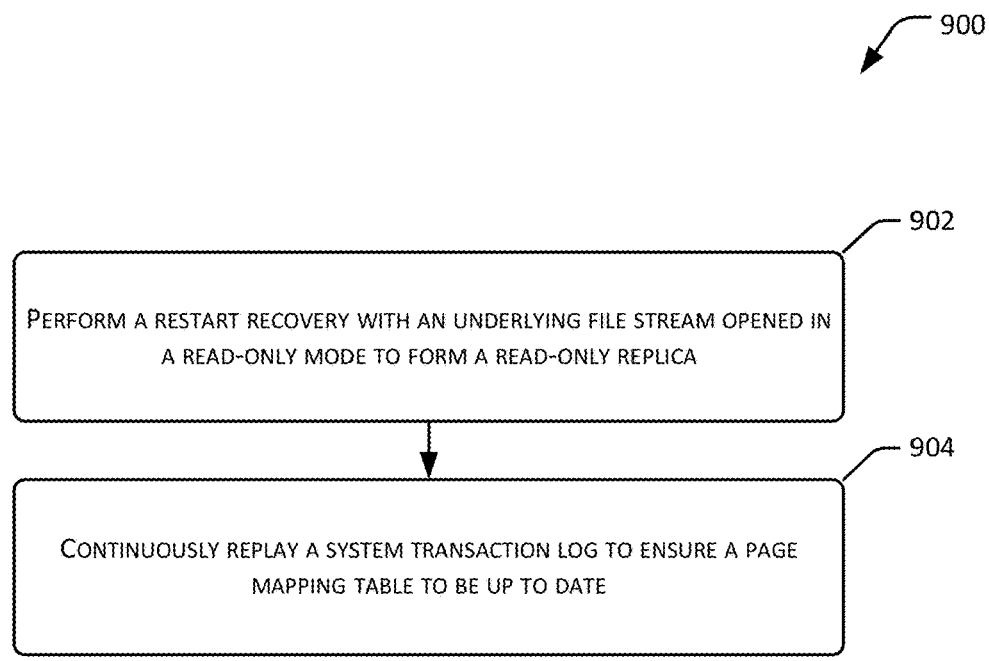
FIG. 9 illustrates an example read replication method.

FIG. 7 illustrates a schematic diagram depicting an example garbage collection method. FIG. 8 illustrates a schematic diagram depicting an example restart recovery method. FIG. 9 illustrates a schematic diagram depicting an example read-only replication method. The methods of FIGS. 7-9 may, but need not, be implemented in the environment of FIG. 1, and using the system of FIG. 2, and the storage architecture of FIG. 3. For ease of explanation, methods 700, 800, and 900 are described with reference to FIGS. 1-3. However, the methods 700, 800, and 900 may alternatively be implemented in other environments and/or using other systems.

The methods 700, 800, and 900 are described in the general context of computer-executable instructions. Generally, computer-executable instructions can include routines, programs, objects, components, data structures, procedures, modules, functions, and the like that perform particular functions or implement particular abstract data types. Furthermore, each of the example methods are illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 7, at block 702, the key-value engine 210 may receive a triggering event to perform garbage collection.

In implementations, the key-value engine 210 may receive a triggering event to perform garbage collection. In implementations, the key-value engine 210 may perform garbage collection on a periodic basis, e.g., after a predetermined time period (such as in every 1 minutes, 10 minutes, 1 hour, etc.) or after a predetermined number of user transactions or system transactions, etc. Additionally or alternatively, the key-value engine 210 may monitor a number of extents included or recorded in the extent usage data structure, and perform garbage collection in response detecting that a number of extents ready for the garbage collection is greater than or equal to a predetermined number threshold. Additionally or alternatively, the key-value engine 210 may receive an instruction from a user (such as an administrator, for example) of the key-value engine 104 or the storage system 102 to perform the garbage collection.

At block 704, the key-value engine 210 may determine one or more extents in a file stream as candidates for the garbage collection based at least in part on an extent usage data structure.

In implementations, after receiving a triggering event to perform garbage collection, the key-value engine 104 may attempt to perform a system transaction for the garbage collection (or simply called a garbage collection system transaction). In implementations, the key-value engine 104 may read a current value of a garbage collection snapshot timestamp (i.e., GCSnapshotTimestamp) as a snapshot read timestamp of the current garbage collection system transaction, and query or determine respective valid data sizes of a plurality of extents using the extent usage data structure. In implementations, the key-value engine 104 may perform a query by searching the extent usage data structure only.

In implementations, the key-value engine 104 may select or determine one or more extents in a file stream as candidates for the garbage collection (or simply called one or more extent GC candidates) in the current garbage collection system transaction. In implementations, the key-value engine 104 may select any sealed extent which have no valid data (i.e., zero valid data size) and whose start system timestamp is not larger or newer than the garbage collection snapshot timestamp. Additionally or alternatively, the key-value engine 104 may select an extent as a candidate for the garbage collection of a total valid data size of the extent is less than a predetermined size threshold. Additionally or alternatively, the key-value engine 104 may order the plurality of extents in an ascending order of the respective total valid data sizes to form a sorted order of the plurality of extents, and select first N number of extents as the candidates for the garbage collection from the sorted order of the plurality of extents, wherein N is an integer greater than zero. In implementations, the file stream may include, but is not limited to, the delta page stream 316 and/or the base page stream 3108, etc.

In implementations, the key-value engine 104 may further determine valid ranges of the one or more extents that are determined to be the candidates for the garbage collection (i.e., the one or more extent GC candidates) as of the snapshot read timestamp of the current garbage collection system transaction. In implementations, if an extent GC candidate is located in a base page stream, the key-value engine 104 may search an extent usage data structure for the extent GC candidate to obtain a search result, and combine the search result with valid ranges identified by snapshot usage page identifiers in the base page stream. Additionally or alternatively, if an extent GC candidate is located in a delta page stream, the key-value engine 104 may scan a page mapping data structure to construct valid ranges for such extent GC candidate as of the snapshot timestamp of the garbage collection, and locate one or more page mapping chains that include valid delta pages.

At block 706, the key-value engine 210 may delete the one or more extents from the file stream.

In implementations, after loading data in each valid range of the one or more extent GC candidates in the memory 208, the key-value engine 104 may further identify valid pages. In implementations, the key-value engine 104 may relocate valid pages in the one or more extent GC candidates, and update the extent usage data structure and the page mapping data structure to reflect such page relocation. In implementations, the key-value engine 104 may delete or remove the one or more extent GC candidates from the file stream (such as the delta page stream 316 and/or the base page stream 318, depending on which file stream each extent GC candidate belongs to). In implementations, the key-value engine 104 may record changes that are made to the extent usage data structure and the page mapping data structure in a log record, and commit the changes to the extent usage data structure and the page mapping data structure after the changes are recorded in the log record.

Referring back to FIG. 8, at block 802, the key-value engine 210 may receive an instruction to perform a restart recovery.

In implementations, the storage engine 102 may experience a system failure due to a system crash or an unexpected shutdown due to power loss, etc. For example, some components (such as one of the storage devices 212) of the storage engine 102 may fail. In implementations, after experiencing the system failure, the storage engine 102 needs to restore or recover the storage system 102 back to a system state or condition prior to the system failure. In implementations, the storage system 102 (or the key-value engine 210) may receive an instruction to perform a restart recovery to attempt to restore or recover the storage system 102 back to a system state or condition prior to the system failure, for example, restoring or recovering all user transactions that have been committed prior to the system failure.

In implementations, the key-value engine 210 may take or create user checkpoints and system checkpoints periodically (e.g., in every predetermined time interval, such as in every one day, five days, one week, etc.) or in response to receiving a triggering action. In implementations, the triggering action may include, but is not limited to, an instruction from a user (such as an administrator, etc.) of the storage system 102, a number of user transactions received or committed being greater than or equal to a predetermined number threshold (such as 10,000 user transactions, etc., which may be configured by the administrator of the storage system 102), etc.

At block 804, the key-value engine 210 may read a metadata log to locate a latest system checkpoint.

In implementations, after receiving the instruction to perform the restart recovery, the key-value engine 210 may read a metadata log that include information of a plurality of system checkpoints that are recorded prior to the system failure to locate a latest system checkpoint. In implementations, the latest system checkpoint is the last system checkpoint that is recorded in the metadata log prior to the system failure. In implementations, the information of a plurality of system checkpoints may include, but is not limited to, storage locations of the system checkpoints that are taken and recorded over a past period of time prior to the system failure. In implementations, in order to avoid a size of the metadata log from being progressively increased, the past period of time may be a predetermined period of time, such as one day, five days, one week, two weeks, one month, etc. Additionally or alternatively, the key-value engine 210 may transfer old data of the metadata log from a storage device 210 storing the metadata log to another storage device 210 that is designated for storing archived data, i.e., data that is rarely read or written for a long period of time (e.g., for longer than a predefined time period such as two weeks, one month, two months, etc.), to free up storage spaces for the storage device 210 that stores the metadata log. In implementations, the key-value engine 210 may transfer the old data of the metadata log from the storage device 210 storing the metadata log to the other storage device 210 that is designated for storing the archived data periodically (such as after each predefined time period, for example) or on demand in response to receiving an instruction from a user (such as an administrator, etc.) of the storage system 102.

In implementations, the latest system checkpoint may include various types of information as described in the foregoing description. By way of example and not limitation, the latest system checkpoint may include, but is not limited to, content of a page mapping data structure (such as a page mapping table, for example), a system transaction replay starting point, user transaction replay starting information for a latest user checkpoint, and a page identifier. In implementations, the content of the page mapping data structure included in the latest system checkpoint corresponds to content of the page mapping data structure that is stored when the latest system checkpoint was written at a system checkpoint timestamp. In implementations, the system transaction replay starting point may be a starting position in the system transaction log for system transactions with timestamps larger than the system checkpoint timestamp. In implementations, the page identifier may indicate a storage location of a data structure of a key-value store in a storage device. In implementations, the data structure may include, for example, a B+ tree, and in this case, the page identifier may include a root page identifier of the B+ tree.

At block 806, the key-value engine 210 may load a page mapping data structure from the latest system checkpoint.

In implementations, after locating the latest system checkpoint, the key-value engine 210 may access the latest system checkpoint at its storage location in a storage device (such as the storage device 210), and load a page mapping data structure from the latest system checkpoint.

At block 808, the key-value engine 210 may replay to apply changes to the page mapping data structure from a system transaction log starting from a system transaction replay starting point.

In implementations, after obtaining the latest system checkpoint, the key-value engine 210 may replay a system transaction log to apply changes to the page mapping data structure starting from a system transaction replay starting point. In implementations, the key-value engine 210 may obtain content of the page mapping data structure (such as the page mapping table, for example) and the system transaction replay starting point from the latest system checkpoint. The key-value engine 210 may reapply system transactions recorded in the system transaction log starting from the system transaction replay starting point to the page mapping data structure (such as the page mapping table, for example).

In implementations, the key-value engine 210 may further obtain user transaction replay starting information from a latest user checkpoint log record, the user transaction replay starting information including a minimum uncommitted user transaction timestamp and a user transaction replay starting point. In implementations, the key-value engine 210 may replay a user transaction log starting from the user transaction replay starting point, while skipping user transactions having a timestamp smaller than the minimum uncommitted user transaction timestamp.

Referring back to FIG. 9, at block 902, the key-value engine 210 may perform a restart recovery with an underlying file stream opened in a read-only mode to form a read-only replica.

In implementations, the key-value engine 210 may perform a restart recovery after a system failure. In implementations, in addition to restoring or recovering a system state of the storage system 102 after a system failure as described in the foregoing description and shown in FIG. 7, the key-value engine 210 may further form one or more read-only replicas using an underlying file stream opened in a read-only mode during recovery after the system failure. The one or more read-only replicas may be used for user transactions that conduct read only transactions to facilitate fast recovery and further provide fast response to such user transactions after the system failure.

At block 904, the key-value engine 210 may continuously replay a system transaction log to ensure a page mapping data structure to be up to date.

In implementations, after performing the restart recovery with the underlying file stream opened in the read-only mode to form the one or more read-only replicas, the key-value engine 210 may continuously replay a system transaction log to ensure a page mapping data structure (such as a page mapping table, for example) to be up to date. In implementations, the key-value engine 210 may further replay a user transaction log to apply data changes into one or more memory buffers in a main memory for the one or more read-only replicas. In implementations, the key-value engine 210 may replay the user transaction log to apply the data changes into the one or more memory buffers in the main memory for the one or more read-only replicas by splitting read-write transactions into the one or more memory buffers in a same way as a writable replica to enable a support of snapshot queries across the one or more memory buffers in the main memory and a data structure on a storage device. In implementations, replaying the user transaction log to apply the data changes into the one or more memory buffers is performed based on information included in one or more memory buffer open log records.

In implementations, the key-value engine 210 may write a memory buffer open log record into the user transaction log to record a memory buffer timestamp of a new memory buffer and a maximum timestamp of user transactions included in one or more previous memory buffers that are opened prior to the new memory buffer, when the new memory buffer is opened for the writable replica.

In implementations, the key-value engine 210 may set a snapshot read timestamp of reading a read-only user transaction from a read-only replica of the one or more read-only replicas based on the current values of the maximum committed system transaction timestamp and the minimum uncommitted user transaction timestamp. In implementations, the key-value engine 210 may continuously maintain the read-only replica with current values of a maximum committed system transaction timestamp and a minimum uncommitted user transaction timestamp.

In implementations, the key-value engine 210 may report a replay progress and a minimum snapshot read system timestamp of user transactions on the read-only replica to a writable replica. In implementations, the key-value engine 210 may ensue that a truncation point of the system transaction log does not advance beyond a replay progress of any read-only replica.

Any of the acts of any of the methods described herein may be implemented at least partially by a processor or other electronic device based on instructions that are stored on one or more computer-readable media. By way of example and not limitation, any of the acts of any of the methods described herein may be implemented under control of one or more processors configured with executable instructions that may be stored on one or more computer-readable media.

CONCLUSION

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally or alternatively, some or all of the operations may be implemented by one or more ASICS, FPGAs, or other hardware.

The present disclosure can be further understood using the following clauses.

Clause 1: A method implemented by one or more processors, the method comprising: receiving a triggering event to perform garbage collection; determining one or more extents in a file stream as candidates for the garbage collection based at least in part on an extent usage data structure; and deleting the one or more extents from the file stream.

Clause 2: The method of Clause 1, wherein receiving the triggering event to perform the garbage collection comprises at least one of: reaching a time set for a garbage collection operation on a regular basis; detecting that a number of extents ready for the garbage collection is greater than or equal to a predetermined number threshold; or receiving a user instruction to perform the garbage collection.

Clause 3: The method of Clause 1, wherein determining the one or more extents as the candidates for the garbage collection comprises: determining respective valid data sizes of a plurality of extents using the extent usage data structure; and selecting an extent as a candidate for the garbage collection of a total valid data size of the extent is less than a predetermined size threshold.

Clause 4: The method of Clause 1, wherein determining the one or more extents as the candidates for the garbage collection comprises: determining respective valid data sizes of a plurality of extents using the extent usage data structure; and ordering the plurality of extents in an ascending order of the respective total valid data sizes to form a sorted order of the plurality of extents; and selecting first N number of extents as the candidates for the garbage collection from the sorted order of the plurality of extents, wherein N is an integer greater than zero.

Clause 5: The method of Clause 1, further comprising: searching an extent usage data structure for an extent of the one or more extents to obtain a search result, if the extent is located in a base page stream; and combining the search result with valid ranges identified by snapshot usage page identifiers in the base page stream.

Clause 6: The method of Clause 5, further comprising: scanning a page mapping data structure to construct valid ranges for an extent of the one or more extents as of a snapshot timestamp of the garbage collection, if the extent is located in a delta page stream; and locating one or more page mapping chains that include valid delta pages.

Clause 7: The method of Clause 6, further comprising: relocating valid pages in the one or more extents; and updating the extent usage data structure and the page mapping data structure; recording changes to the extent usage data structure and the page mapping data structure in a log record; and committing the changes to the extent usage data structure and the page mapping data structure after the changes are recorded in the log record.

Clause 8: One or more processor readable media storing executable instructions that, when executed by one or more processors, cause the one or more processors to perform act comprising: receiving a triggering event to perform garbage collection; determining one or more extents in a file stream as candidates for the garbage collection based at least in part on an extent usage data structure; and deleting the one or more extents from the file stream.

Clause 9: The one or more processor readable media of Clause 8, wherein receiving the triggering event to perform the garbage collection comprises at least one of: reaching a time set for a garbage collection operation on a regular basis; detecting that a number of extents ready for the garbage collection is greater than or equal to a predetermined number threshold; or receiving a user instruction to perform the garbage collection.

Clause 10: The one or more processor readable media of Clause 8, wherein determining the one or more extents as the candidates for the garbage collection comprises: determining respective valid data sizes of a plurality of extents using the extent usage data structure; and selecting an extent as a candidate for the garbage collection of a total valid data size of the extent is less than a predetermined size threshold.

Clause 11: The one or more processor readable media of Clause 8, wherein determining the one or more extents as the candidates for the garbage collection comprises: determining respective valid data sizes of a plurality of extents using the extent usage data structure; and ordering the plurality of extents in an ascending order of the respective total valid data sizes to form a sorted order of the plurality of extents; and selecting first N number of extents as the candidates for the garbage collection from the sorted order of the plurality of extents, wherein N is an integer greater than zero.

Clause 12: The one or more processor readable media of Clause 8, the acts further comprising: searching an extent usage data structure for an extent of the one or more extents to obtain a search result, if the extent is located in a base page stream; and combining the search result with valid ranges identified by snapshot usage page identifiers in the base page stream.

Clause 13: The one or more processor readable media of Clause 12, the acts further comprising: scanning a page mapping data structure to construct valid ranges for an extent of the one or more extents as of a snapshot timestamp of the garbage collection, if the extent is located in a delta page stream; and locating one or more page mapping chains that include valid delta pages.

Clause 14: The one or more processor readable media of Clause 13, the acts further comprising: relocating valid pages in the one or more extents; and updating the extent usage data structure and the page mapping data structure; recording changes to the extent usage data structure and the page mapping data structure in a log record; and committing the changes to the extent usage data structure and the page mapping data structure after the changes are recorded in the log record.

Clause 15: A system comprising: one or more processors; and memory storing executable instructions that, when executed by the one or more processors, cause the one or more processors to perform acts comprising: receiving a triggering event to perform garbage collection; determining one or more extents in a file stream as candidates for the garbage collection based at least in part on an extent usage data structure; and deleting the one or more extents from the file stream.

Clause 16: The system of Clause 15, wherein receiving the triggering event to perform the garbage collection comprises at least one of: reaching a time set for a garbage collection operation on a regular basis; detecting that a number of extents ready for the garbage collection is greater than or equal to a predetermined number threshold; or receiving a user instruction to perform the garbage collection.

Clause 17: The system of Clause 15, wherein determining the one or more extents as the candidates for the garbage collection comprises: determining respective valid data sizes of a plurality of extents using the extent usage data structure; and selecting an extent as a candidate for the garbage collection of a total valid data size of the extent is less than a predetermined size threshold.

Clause 18: The system of Clause 15, wherein determining the one or more extents as the candidates for the garbage collection comprises: determining respective valid data sizes of a plurality of extents using the extent usage data structure; and ordering the plurality of extents in an ascending order of the respective total valid data sizes to form a sorted order of the plurality of extents; and selecting first N number of extents as the candidates for the garbage collection from the sorted order of the plurality of extents, wherein N is an integer greater than zero.

Clause 19: The system of Clause 15, the acts further comprising: searching an extent usage data structure for an extent of the one or more extents to obtain a search result, if the extent is located in a base page stream; and combining the search result with valid ranges identified by snapshot usage page identifiers in the base page stream.

Clause 20: The system of Clause 15, the acts further comprising: scanning a page mapping data structure to construct valid ranges for an extent of the one or more extents as of a snapshot timestamp of the garbage collection, if the extent is located in a delta page stream; and locating one or more page mapping chains that include valid delta pages.

Clause 21: A method implemented by a key-value engine, the method comprising: reading a metadata log to locate a latest system checkpoint; loading a page mapping table from the latest system checkpoint; and replaying to apply changes to the page mapping table from a system transaction log starting from a system transaction replay starting point.

Clause 22: The method of Clause 21, further comprising receiving an instruction to perform a restart recovery.

Clause 23: The method of Clause 21, wherein the metadata log comprises storage locations of one or more system checkpoints that were taken over a past period of time.

Clause 24: The method of Clause 21, wherein the latest system checkpoint comprises: content of the page mapping table, the content of the page mapping table being stored when the latest system checkpoint was written at a system checkpoint timestamp, the system transaction replay starting point, the system transaction replay starting point being a starting position in the system transaction log for system transactions with timestamps larger than the system checkpoint timestamp, and user transaction replay starting information for a latest user checkpoint.

Clause 25: The method of Clause 24, wherein the latest system checkpoint further comprises: a page identifier indicating a storage location of a data structure of a key-value store in a storage device.

Clause 26: The method of Clause 25, wherein the data structure comprises a tree data structure, and the page identifier comprises a root page identifier of the tree data structure.

Clause 27: The method of Clause 21, further comprising taking user checkpoints and system checkpoints periodically or in response to receiving a triggering action.

Clause 28: The method of Clause 21, further comprising obtaining user transaction replay starting information from a latest user checkpoint log record, the user transaction replay starting information comprising a minimum uncommitted user transaction timestamp and a user transaction replay starting point.

Clause 29: The method of Clause 28, further comprising replaying a user transaction log starting from the user transaction replay starting point, while skipping user transactions having a timestamp smaller than the minimum uncommitted user transaction timestamp.

Clause 30: An engine comprising: one or more processors; memory storing executable instructions that, when executed by the one or more processors, cause the one or more processors to perform acts comprising: performing a restart recovery with an underlying file stream opened in a read-only mode to form a read-only replica; and continuously replaying a system transaction log to ensure a page mapping table to be up to date.

Clause 31: The engine of Clause 30, the acts further comprising reporting a replay progress and a minimum snapshot read system timestamp of user transactions on the read-only replica to a writable replica.

Clause 32: The engine of Clause 30, further comprising ensuring that a truncation point of the system transaction log does not advance beyond a replay progress of any read-only replica.

Clause 33: The engine of Clause 30, further comprising replaying a user transaction log to apply data changes into one or more memory buffers in a main memory for the read-only replica.

Clause 34: The engine of Clause 33, wherein replaying the user transaction log comprises splitting read-write transactions into the one or more memory buffers in a same way as a writable replica to enable a support of snapshot queries across the one or more memory buffers in the main memory and a data structure on a storage device.

Clause 35: The engine of Clause 34, further comprising writing a memory buffer open log record into the user transaction log to record a memory buffer timestamp of a new memory buffer and a maximum timestamp of user transactions included in one or more previous memory buffers that are opened prior to the new memory buffer, when the new memory buffer is opened for the writable replica.

Clause 36: The engine of Clause 35, wherein replaying the user transaction log to apply the data changes into the one or more memory buffers is performed based on information included in one or more memory buffer open log records.

Clause 37: The engine of Clause 30, wherein the read-only replica is continuously maintained with current values of a maximum committed system transaction timestamp and a minimum uncommitted user transaction timestamp.

Clause 38: The engine of Clause 35, further comprising setting a snapshot read timestamp of reading a read-only user transaction from the read-only replica based on the current values of the maximum committed system transaction timestamp and the minimum uncommitted user transaction timestamp.

Clause 39: One or more processor readable media storing executable instructions that, when executed by one or more processors, cause the one or more processors to perform acts comprising: receiving an instruction to perform a restart recovery; reading a metadata log to locate a latest system checkpoint; loading a page mapping table from the latest system checkpoint; and replaying to apply changes to the page mapping table from a system transaction log starting from a system transaction replay starting point.

Clause 40: The one or more processor readable media of Clause 39, wherein the metadata log comprises storage locations of one or more system checkpoints that were taken over a past period of time, and wherein the latest system checkpoint comprises: content of the page mapping table, the content of the page mapping table being stored when the latest system checkpoint was written at a system checkpoint timestamp, the system transaction replay starting point, the system transaction replay starting point being a starting position in the system transaction log for system transactions with timestamps larger than the system checkpoint timestamp, and user transaction replay starting information for a latest user checkpoint.

What is claimed is:

1. A method implemented by a key-value engine, the method comprising:
reading a metadata log to locate a latest system checkpoint;
loading a page mapping table from the latest system checkpoint;
replaying to apply changes to the page mapping table from a system transaction log starting from a system transaction replay starting point;
obtaining user transaction replay starting information from a latest user checkpoint log record, the user transaction replay starting information comprising a minimum uncommitted user transaction timestamp and a user transaction replay starting point, wherein the minimum uncommented user transaction timestamp is a minimum user transaction timestamp among user transaction timestamps that are associated with all uncommitted user transactions, and the user transaction replay starting point is a starting position from which corresponding data of the system transaction loci is recovered during a restart recovery; and
replaying a user transaction log starting from the user transaction replay starting point, while skipping user transactions having a timestamp smaller than the minimum uncommitted user transaction timestamp.

2. The method of claim 1, further comprising receiving an instruction to perform the restart recovery.

3. The method of claim 1, wherein the metadata log comprises storage locations of one or more system checkpoints that were taken over a past period of time.

4. The method of claim 1, wherein the latest system checkpoint comprises:
content of the page mapping table, the content of the page mapping table being stored when the latest system checkpoint was written at a system checkpoint timestamp,
the system transaction replay starting point, the system transaction replay starting point being a starting position in the system transaction log for system transactions with timestamps larger than the system checkpoint timestamp, and
user transaction replay starting information for a latest user checkpoint.

5. The method of claim 4, wherein the latest system checkpoint further comprises: a page identifier indicating a storage location of a data structure of a key-value store in a storage device.

6. The method of claim 5, wherein the data structure comprises a tree data structure, and the page identifier comprises a root page identifier of the tree data structure.

7. The method of claim 1, further comprising taking user checkpoints and system checkpoints periodically or in response to receiving a triggering action.

8. An engine comprising:
one or more processors;
memory storing executable instructions that, when executed by the one or more processors, cause the one or more processors to perform acts comprising:
performing a restart recovery with an underlying file stream opened in a read-only mode to form a read-only replica; and
continuously replaying a system transaction log to ensure a page mapping table to be up to date; and
replaying a user transaction log to apply data changes into one or more memory buffers in a main memory for the read-only replica, wherein replaying the user transaction log comprises splitting read-write transactions into the one or more memory buffers in a same way as a writable replica to enable a support of snapshot queries across the one or more memory buffers in the main memory and a data structure on a storage device.

9. The engine of claim 8, the acts further comprising reporting a replay progress and a minimum snapshot read system timestamp of user transactions on the read-only replica to a writable replica.

10. The engine of claim 8, the acts further comprising ensuring that a truncation point of the system transaction log does not advance beyond a replay progress of any read-only replica.

11. The engine of claim 8, the acts further comprising writing a memory buffer open log record into the user transaction log to record a memory buffer timestamp of a new memory buffer and a maximum timestamp of user transactions included in one or more previous memory buffers that are opened prior to the new memory buffer, when the new memory buffer is opened for the writable replica.

12. The engine of claim 11, wherein replaying the user transaction log to apply the data changes into the one or more memory buffers is performed based on information included in one or more memory buffer open log records.

13. The engine of claim 8, wherein the read-only replica is continuously maintained with current values of a maximum committed system transaction timestamp and a minimum uncommitted user transaction timestamp.

14. The engine of claim 13, the acts further comprising setting a snapshot read timestamp of reading a read-only user transaction from the read-only replica based on the current values of the maximum committed system transaction timestamp and the minimum uncommitted user transaction timestamp.

15. One or more processor readable media storing executable instructions that, when executed by one or more processors, cause the one or more processors to perform acts comprising:
reading a metadata log to locate a latest system checkpoint;
loading a page mapping table from the latest system checkpoint;
replaying to apply changes to the page mapping table from a system transaction log starting from a system transaction replay starting point;
obtaining user transaction replay starting information from a latest user checkpoint log record, the user transaction replay starting information comprising a minimum uncommitted user transaction timestamp and a user transaction replay starting point, wherein the minimum uncommented user transaction timestamp is a minimum user transaction timestamp among user transaction timestamps that are associated with all uncommitted user transactions, and the user transaction replay starting point is a starting position from which corresponding data of the system transaction loci is recovered during a restart recovery; and replaying a user transaction log starting from the user transaction replay starting point, while skipping user transactions having a timestamp smaller than the minimum uncommitted user transaction timestamp.

16. The one or more processor readable media of claim 15, wherein the metadata log comprises storage locations of one or more system checkpoints that were taken over a past period of time, and wherein the latest system checkpoint comprises:
  content of the page mapping table, the content of the page mapping table being stored when the latest system checkpoint was written at a system checkpoint timestamp,
  the system transaction replay starting point, the system transaction replay starting point being a starting position in the system transaction log for system transactions with timestamps larger than the system checkpoint timestamp, and
  user transaction replay starting information for a latest user checkpoint.

17. The one or more processor readable media of claim 16, wherein the latest system checkpoint further comprises: a page identifier indicating a storage location of a data structure of a key-value store in a storage device.

18. The one or more processor readable media of claim 17, wherein the data structure comprises a tree data structure, and the page identifier comprises a root page identifier of the tree data structure.

19. The one or more processor readable media of claim 15, the acts further comprising receiving an instruction to perform the restart recovery.

20. The one or more processor readable media of claim 15, wherein the metadata log comprises storage locations of one or more system checkpoints that were taken over a past period of time.

* * * * *